United States Patent
Jia et al.

(10) Patent No.: US 12,196,609 B2
(45) Date of Patent: Jan. 14, 2025

(54) AMBIENT LIGHT DETECTION METHOD AND ELECTRONIC DEVICE

(71) Applicant: Honor Device Co., Ltd., Shenzhen (CN)

(72) Inventors: Xianzhao Jia, Shenzhen (CN); Yingjie Zhu, Shenzhen (CN); Chenlong Li, Shenzhen (CN)

(73) Assignee: Honor Device Co., Ltd., Shenzhen (CN)

(*) Notice: Subject to any disclaimer, the term of this patent is extended or adjusted under 35 U.S.C. 154(b) by 0 days.

(21) Appl. No.: 17/923,132

(22) PCT Filed: Mar. 31, 2022

(86) PCT No.: PCT/CN2022/084664
§ 371 (c)(1),
(2) Date: Nov. 3, 2022

(87) PCT Pub. No.: WO2022/262368
PCT Pub. Date: Dec. 22, 2022

(65) Prior Publication Data
US 2024/0247978 A1   Jul. 25, 2024

(30) Foreign Application Priority Data

Jun. 15, 2021 (CN) .......................... 202110661847.4
Aug. 6, 2021 (CN) .......................... 202110904449.0

(51) Int. Cl.
*G01J 1/42* (2006.01)
*G01J 1/02* (2006.01)
(Continued)

(52) U.S. Cl.
CPC ............ *G01J 1/4204* (2013.01); *G01J 1/0219* (2013.01); *G01J 1/4228* (2013.01);
(Continued)

(58) Field of Classification Search
CPC ...... G01J 1/4204; G01J 1/0219; G01J 1/4228; G09G 3/3208; G09G 3/36;
(Continued)

(56) References Cited

U.S. PATENT DOCUMENTS 8,466,966 B1   6/2013   Ciesco
10,614,752 B1   4/2020   Dodson et al.
(Continued)

FOREIGN PATENT DOCUMENTS

CN   105074927 A   11/2015
CN   204903001 U   12/2015
(Continued)

*Primary Examiner* — Thanh Luu
*Assistant Examiner* — Monica T Taba
(74) *Attorney, Agent, or Firm* — Leydig, Voit & Mayer, Ltd.

(57) ABSTRACT

An ambient light detection method and an electronic device are provided to prevent leaked screen light and/or screen transmittance from affecting ambient light detection. The method is applied to an electronic device. A first ambient light detection unit and a second ambient light detection unit are disposed in the electronic device. A first photosensitive area of the first ambient light detection unit is used to detect intensity of first light, and a second photosensitive area of the second ambient light detection unit is used to detect intensity of second light. The first light includes ambient light and leaked screen light, and the second light includes the leaked screen light. A calibration coefficient is further configured in the electronic device. The method includes: the electronic device determines intensity of the ambient light based on a first value, a second value, and the calibration coefficient.

17 Claims, 12 Drawing Sheets

(51) Int. Cl.
*G09G 3/3208* (2016.01)
*G09G 3/36* (2006.01)

(52) U.S. Cl.
CPC ............. *G09G 3/3208* (2013.01); *G09G 3/36* (2013.01); *G09G 2320/0626* (2013.01); *G09G 2320/0693* (2013.01); *G09G 2360/144* (2013.01); *G09G 2360/145* (2013.01)

(58) Field of Classification Search
CPC ... G09G 2320/0626; G09G 2320/0693; G09G 2360/144; G09G 2360/145
See application file for complete search history.

(56) References Cited

U.S. PATENT DOCUMENTS

| | | | |
|---|---|---|---|
| 11,107,395 B2 * | 8/2021 | Chen | ........................ G09G 5/10 |
| 2010/0073340 A1 | 3/2010 | Morimoto | |
| 2014/0224961 A1 | 8/2014 | Nelson et al. | |
| 2022/0301519 A1 | 9/2022 | Greimel-Laengauer | |

FOREIGN PATENT DOCUMENTS

| | | | |
|---|---|---|---|
| CN | 109819088 A | | 5/2019 |
| CN | 111380609 A | * | 7/2020 |
| CN | 111969026 A | | 11/2020 |
| CN | 112599088 A | | 4/2021 |
| CN | 112710383 A | | 4/2021 |
| CN | 112710388 A | | 4/2021 |
| WO | 2021110745 A1 | | 6/2021 |

* cited by examiner

Ambient light sensor

Dark field calibration

Bright field calibration

AMBIENT LIGHT DETECTION METHOD AND ELECTRONIC DEVICE

CROSS-REFERENCE TO RELATED APPLICATIONS

This application is a national stage of International Application No. PCT/CN2022/084664, filed on Mar. 31, 2022, which claims priority to Chinese Patent Application No. 202110661847.4, filed on Jun. 15, 2021, and Chinese Patent Application No. 202110904449.0, filed on Aug. 6, 2021, all of which are incorporated herein by reference in their entireties.

TECHNICAL FIELD

Embodiments of this application relate to the field of electronic devices, and in particular, to an ambient light detection method and an electronic device.

BACKGROUND

An electronic device may detect intensity of ambient light by using an ambient light sensor, and then automatically adjust screen brightness to improve display performance. In a current ambient light detection solution, detection on ambient light performed by the ambient light sensor is inevitably affected by leaked screen light, and intensity detection on the ambient light is not accurate enough. However, relatively large computational overheads are consumed if the electronic device performs calculation based on content displayed on a display screen, to eliminate an impact of the leaked screen light from a response of the ambient light sensor.

SUMMARY

Embodiments of this application provide an ambient light detection method and an electronic device, to prevent leaked screen light and/or screen transmittance from affecting ambient light detection, thereby implementing accurate ambient light detection and avoiding relatively high computational overheads caused to the electronic device.

To achieve the foregoing objective, the embodiments of this application adopt the following technical solutions.

According to a first aspect, an ambient light detection method is provided, where the method is applied to an electronic device. A first ambient light detection unit and a second ambient light detection unit are disposed in the electronic device. A first photosensitive area of the first ambient light detection unit is used to detect intensity of first light, and a second photosensitive area of the second ambient light detection unit is used to detect intensity of second light. The first light includes ambient light and leaked screen light, and the second light includes the leaked screen light. A calibration coefficient is further configured in the electronic device, and the calibration coefficient is used to indicate a relationship between intensity of the ambient light and each of a first value and a second value. The first value is an output value of the first ambient light detection unit in response to the first light, and the second value is an output value of the second ambient light detection unit in response to the second light. The method includes: The electronic device determines the intensity of the ambient light based on the first value, the second value, and the calibration coefficient.

Based on the solution, a solution of accurately detecting ambient light is provided. In this example, the calibration coefficient may be configured in the electronic device, and through calibration performed by using the calibration coefficient, an impact of the leaked screen light can be accurately stripped from the first value, so as to accurately detect the ambient light. It can be understood that the first ambient light detection unit may be configured to receive the leaked screen light and the ambient light, and the second ambient light detection unit may be configured to receive the leaked screen light. In some implementations, to achieve the foregoing effect, a film may be coated on a path through which the second ambient light detection unit receives the ambient light, to reflect the ambient light (such as total reflection or near total reflection), so that most of the light received by the second ambient light detection unit can be considered as the leaked screen light. Due to differences between positions and responses of different ambient light detection units, in the solution in this application, the calibration coefficient may be used to calibrate an error in calculation caused by a small amount of ambient light inevitably received by the second ambient light detection unit and an error caused by a difference between responses made by the first ambient light detection unit and the second ambient light detection unit. In this way, the ambient light may be accurately detected. In addition, the electronic device does not need to autonomously perform calculation based on content currently displayed on a display screen, and screen out an impact of the leaked screen light from a response of an ambient light sensor by using an algorithm, so as to avoid computational overheads and inaccuracy of a calculation result that are caused by the operation.

In a possible design, the calibration coefficient is obtained based on a dark field calibration coefficient and a bright field calibration coefficient. The dark field calibration coefficient is used to indicate a difference between responses made by the first ambient light detection unit and the second ambient light detection unit to received ambient light and/or leaked screen light. The bright field calibration coefficient is used to indicate, when there is the ambient light, a correspondence between a first response value and each of the output value of the first ambient light detection unit and the output value of the second ambient light detection unit. The first response value is an output value of the first ambient light detection unit in response to the ambient light. Based on this solution, a method for obtaining a calibration coefficient is provided. It can be understood that, with reference to the solution provided in the first aspect, the calibration coefficient plays a very important role in a process of accurately obtaining an ambient light detection result. In this example, a method for obtaining a calibration coefficient is provided. For example, calibration coefficients currently corresponding to the first ambient light detection unit and the second ambient light detection unit are obtained by using a dark field calibration process and a bright field calibration process.

In a possible design, the dark field calibration coefficient is obtained through dark field calibration. The dark field calibration includes: In a dark field environment, the electronic device controls a display screen of the electronic device to display a first interface, where no ambient light exists in the dark field environment; obtains a third value output by the first ambient light detection unit and a fourth value output by the second ambient light detection unit; and obtains the dark field calibration coefficient based on the third value and the fourth value. Based on this solution, a specific implementation example of the dark field calibration is provided. In this example, a calibration process may be performed in the dark field environment. The dark field calibration coefficient is determined by using a difference between responses made by two ambient light detection units to same input light.

In a possible design, before the electronic device controls the display screen of the electronic device to display the first interface, the method further includes: The electronic device controls the display screen of the electronic device to be off, and the electronic device determines that a current environment is the dark field environment when the output value of the first ambient light detection unit and/or the output value of the second ambient light detection unit are/is less than a dark field threshold. Based on this solution, an example of a solution of determining that a current environment is a dark field environment. In this solution, the electronic device can determine that the current environment is the dark field environment, thereby ensuring accuracy of the dark field calibration process.

In a possible design, the first interface is a single-color interface. Based on this solution, a solution of providing light in the dark field calibration process is provided. In this example, in the dark field calibration process, the electronic device may be controlled to display a single-color interface, to obtain a difference between responses made by two ambient light detection units to same light. In a possible design, the first interface is a white interface. Based on this solution, a solution of providing light in the dark field calibration process is provided. For example, the electronic device may control the display screen to display a white interface, to determine a difference between responses made by two ambient light detection units to light. Because a wavelength of white light is in the middle of a wavelength of visible light, a dark field calibration coefficient obtained through calibration of the wavelength of the white light can also be well applied to scenarios in which other colors in a visible light band are displayed.

In a possible design, after the obtaining a third value output by the first ambient light detection unit and a fourth value output by the second ambient light detection unit, the dark field calibration further includes: The electronic device controls the display screen of the electronic device to display a second interface, where a color of the second interface is different from a color of the first interface; and obtains a fifth value output by the second ambient light detection unit and a sixth value output by the second ambient light detection unit. The obtaining the dark field calibration coefficient based on the third value and the fourth value includes: obtaining the dark field calibration coefficient through calculation based on the third value, the fourth value, the fifth value, and the sixth value. Based on the solution, another dark field calibration mechanism is provided. For example, because differences between responses made by two ambient light detection units to light of different colors are different, in some embodiments of this application, the electronic device may control the display screen to separately display interfaces of different colors, and obtain differences between responses made by the two ambient light detection units in the interfaces of different colors. Based on the response differences in the plurality of color scenarios, a difference between responses made by the two ambient light detection units to light is finally determined.

In a possible design, the bright field calibration coefficient is obtained through bright field calibration. The bright field calibration includes: In a bright field environment, the electronic device controls the display screen of the electronic device to be off, where a preset ambient light source is disposed in the bright field environment; obtains a seventh value output by the first ambient light detection unit and an eighth value output by the second ambient light detection unit; and determines the bright field calibration coefficient based on the seventh value and the eighth value. Based on this solution, an example of a solution of obtaining a bright field calibration coefficient is provided. In this example, the electronic device may obtain, through the bright field calibration, a difference between responses made by two ambient light detection units in a scenario in which only ambient light is received; and may effectively screen out, based on the response difference by using the bright field calibration coefficient, a small amount of ambient light received by the second ambient light detection unit, thereby improving overall accuracy of ambient light detection.

In a possible design, the determining the bright field calibration coefficient based on the seventh value and the eighth value includes: determining the bright field calibration coefficient according to the following formula: $Z=x-K \times y$, where Z is the bright field calibration coefficient, x is the seventh value, y is the eighth value, and K is the dark field calibration coefficient. Based on this solution, a specific calculation example of the bright field calibration coefficient is provided. Based on this example, the electronic device can accurately and quickly obtain the bright field calibration coefficient through calculation.

In a possible design, the calibration coefficient is obtained through calculation according to the following formula: $a=L/Z$, where a is the calibration coefficient, L is intensity of the preset ambient light source in the bright field calibration process, and Z is the bright field calibration coefficient. Based on this solution, a specific calculation example of the calibration coefficient is provided. Based on this example, the electronic device can accurately and quickly obtain the calibration coefficient through calculation.

In a possible design, after the obtaining the calibration coefficient, the method further includes: storing the calibration coefficient in a memory of the electronic device. Based on this solution, a specific implementation of a solution of detecting ambient light based on a calibration coefficient is provided. For example, the calibration coefficient obtained through calculation may be stored in the memory of the electronic device in advance, so that when ambient light detection is required, the electronic device may invoke the calibration coefficient from the memory to implement fast and accurate ambient light detection.

In a possible design, when the dark field calibration coefficient does not fall within a preset dark field calibration interval, it is determined that the electronic device currently performing dark field calibration fails in the calibration; and/or when the bright field calibration coefficient does not fall within a preset bright field calibration interval, it is determined that the electronic device currently performing bright field calibration fails in the calibration. Based on this solution, an example of screening out a defective electronic device in the dark field calibration process and/or the bright field calibration process is provided. It should be understood that, for the first ambient light detection unit and the second ambient light detection unit with a same design, bright field calibration results and/or dark field calibration results should approximate to each other. However, if it is found in calibration processes of some devices that a calibration result does not fall within a preset range or is significantly different from a calibration result of another device, it can be considered that the calibration process has an error, and recalibration is required. If this is still the case after the recalibration, it indicates that a problem exists in production of the first ambient light detection unit and/or the second ambient light detection unit of the device. Therefore, these devices may be screened out from non-defective devices, thereby screening out a defective product and improving a yield rate.

According to a second aspect, an ambient light detection method is provided, where the method is applied to an electronic device. A first ambient light detection unit and a second ambient light detection unit are disposed in the electronic device. A first photosensitive area of the first ambient light detection unit is used to detect intensity of first light, and a second photosensitive area of the second ambient light detection unit is used to detect intensity of second light. The first light includes ambient light and leaked screen light, and the second light includes the leaked screen light. The method includes: The first ambient light detection unit receives the first light and outputs a first value, where the first value is used to identify the intensity of the first light. The second ambient light detection unit receives the second light and outputs a second value, where the second value is used to identify the intensity of the second light. A processor of the electronic device determines intensity of the ambient light based on the first value, the second value, and a calibration coefficient stored in the electronic device.

Based on the solution, a solution of accurately detecting ambient light is provided. In this example, the calibration coefficient may be configured in the electronic device, and through calibration performed by using the calibration coefficient, an impact of the leaked screen light can be accurately stripped from the first value, so as to accurately detect the ambient light. It can be understood that the first ambient light detection unit may be configured to receive the leaked screen light and the ambient light, and the second ambient light detection unit may be configured to receive the leaked screen light. In some implementations, to achieve the foregoing effect, a film may be coated on a path through which the second ambient light detection unit receives the ambient light, to reflect the ambient light (such as total reflection or near total reflection), so that most of the light received by the second ambient light detection unit can be considered as the leaked screen light. Due to differences between positions and responses of different ambient light detection units, in the solution in this application, the calibration coefficient may be used to calibrate an error in calculation caused by a small amount of ambient light inevitably received by the second ambient light detection unit and an error caused by a difference between responses made by the first ambient light detection unit and the second ambient light detection unit. In this way, the ambient light may be accurately detected. In addition, the electronic device does not need to autonomously perform calculation based on content currently displayed on a display screen, and screen out an impact of the leaked screen light from a response of an ambient light sensor by using an algorithm, so as to avoid computational overheads and inaccuracy of a calculation result that are caused by the operation.

In a possible design, the calibration coefficient is obtained according to the ambient light detection method in the first aspect and any one of the possible designs in the first aspect.

In a possible design, before the processor of the electronic device determines the intensity of the ambient light based on the first value, the second value, and the calibration coefficient stored in the electronic device, the method further includes: The processor obtains the first value from the first ambient light detection unit, and obtains the second value from the second ambient light detection unit.

In a possible design, before the processor of the electronic device determines the intensity of the ambient light in a current environment based on the first value, the second value, and the calibration coefficient stored in the electronic device, the method further includes: The processor reads the calibration coefficient from the memory of the electronic device, where the calibration coefficient is used to indicate a relationship between the intensity of the ambient light and each of the first value and the second value.

According to a third aspect, an electronic device is provided. The electronic device includes one or more processors and one or more memories. The one or more memories are coupled to the one or more processors, and the one or more memories store computer instructions. When the one or more processors execute the computer instructions, the electronic device is enabled to perform the ambient light detection method according to the first aspect and any one of the possible designs in the first aspect, or the electronic device is enabled to perform the ambient light detection method according to the second aspect and any one of the possible designs in the second aspect.

According to a fourth aspect, a chip system is provided, where the chip system includes an interface circuit and a processor. The interface circuit and the processor are interconnected by using a line. The interface circuit is configured to receive a signal from a memory and send the signal to the processor, where the signal includes computer instructions stored in the memory. When the processor executes the computer instructions, the chip system performs the ambient light detection method according to the first aspect and any one of the possible designs in the first aspect, or the chip system performs the ambient light detection method according to the second aspect and any one of the possible designs in the second aspect.

According to a fifth aspect, a computer-readable storage medium is provided, where the computer-readable storage medium includes computer instructions. When the computer instructions are run, the ambient light detection method according to the first aspect and any one of the possible designs in the first aspect is performed, or the ambient light detection method according to the second aspect and any one of the possible designs in the second aspect is performed.

According to a sixth aspect, a computer program product is provided, where the computer program product includes instructions. When the computer program product is run on a computer, the computer is enabled to perform, based on the instructions, the ambient light detection method according to the first aspect and any one of the possible designs in the first aspect, or the ambient light detection method according to the second aspect and any one of the possible designs in the second aspect.

It should be understood that all technical features of the technical solutions provided in the second aspect to the sixth aspect can correspond to the ambient light detection method provided in the first aspect and the possible designs in the first aspect, and therefore similar beneficial effects can be achieved. Details are not described herein again.

DESCRIPTION OF EMBODIMENTS

In an operation process, an electronic device may perform corresponding adjustment based on intensity of light in an environment (for example, the light is referred to as ambient light for short), thereby improving user experience of a user in a process of using the electronic device. For example, the electronic device may adaptively adjust screen brightness based on intensity of the ambient light. For example, in a scenario with relatively strong ambient light, the electronic device may control a display screen (or referred to as a screen) to perform display with relatively high screen brightness, thereby avoiding a case in which a user cannot clearly see content displayed on the screen due to the relatively strong ambient light. For another example, when the ambient light is relatively weak, the electronic device may control the screen to perform display with relatively low screen brightness, thereby protecting a user's vision.

In some implementations, the electronic device may determine the intensity of the ambient light by using an ambient light sensor (ALS) disposed in the electronic device.

Figure 1:
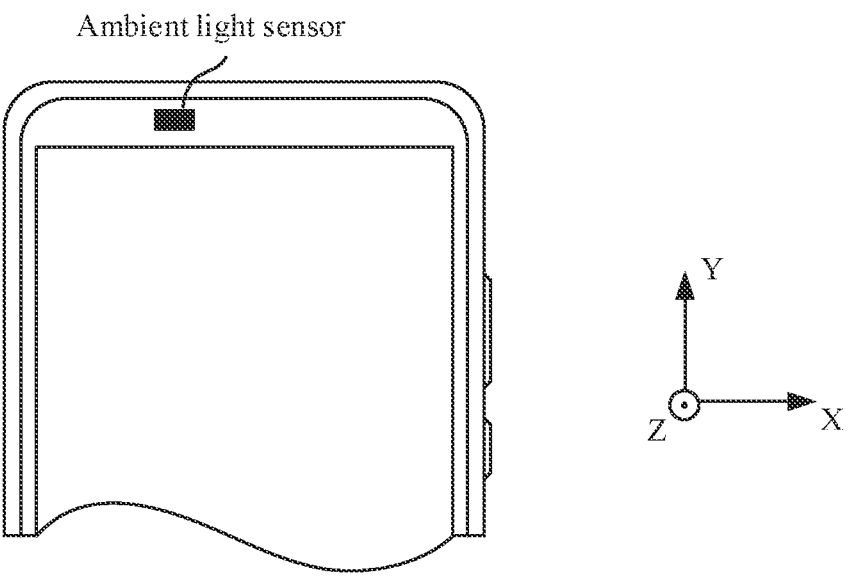
FIG. 1 is a schematic diagram of an arrangement of an ambient light sensor.
Figure 2:
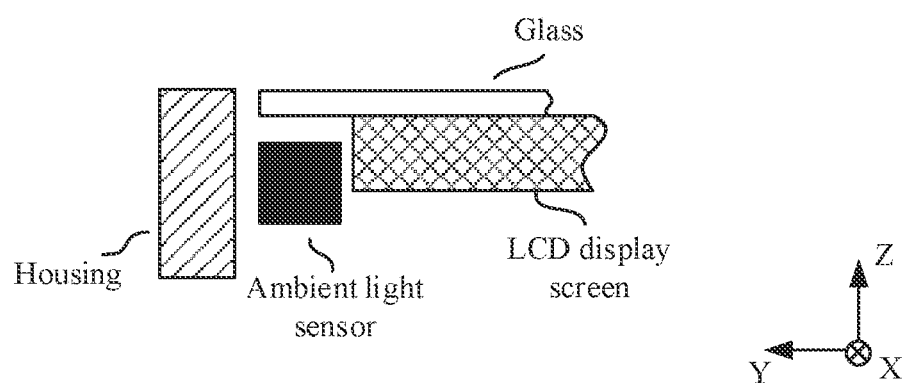
FIG. 2 is a schematic diagram of an arrangement of an ambient light sensor.

For example, the electronic device is a mobile phone. FIG. 1 shows an example of a position of an ambient light sensor. As shown in FIG. 1, the ambient light sensor may be disposed on the head of the mobile phone. For example, the ambient light sensor may be disposed between a screen of the mobile phone and a housing of the mobile phone, and it is also ensured that a photosensitive surface of the ambient light sensor can receive light from an external environment from the front of the mobile phone. FIG. 2 shows a side cross-sectional view of a mobile phone. The cross section may be tangent to the ambient light sensor, so that the position of the ambient light sensor can be visually seen in the side cross-sectional view shown in FIG. 2.

In the example shown in FIG. 2, the ambient light sensor may be disposed in a gap between the screen (such as a liquid crystal display (LCD) screen) and the housing on the head of the mobile phone. The ambient light sensor may be covered with glass attached to the screen. Ambient light in the position shown in FIG. 2 may be received by using the photosensitive surface of the ambient light sensor. In this way, the ambient light sensor can determine intensity of ambient light in a current environment based on intensity of the light received by the photosensitive surface. For example, with reference to FIG. 3, ambient light may pass through the glass to be incident on the ambient light sensor, so that the ambient light sensor can make a corresponding response based on intensity of received light, and obtain an output value corresponding to the intensity of the received light.

It can be understood that, if all light received by the ambient light sensor comes from the ambient light, an output value of the ambient light sensor may be used to identify intensity of the ambient light.

Figure 3:
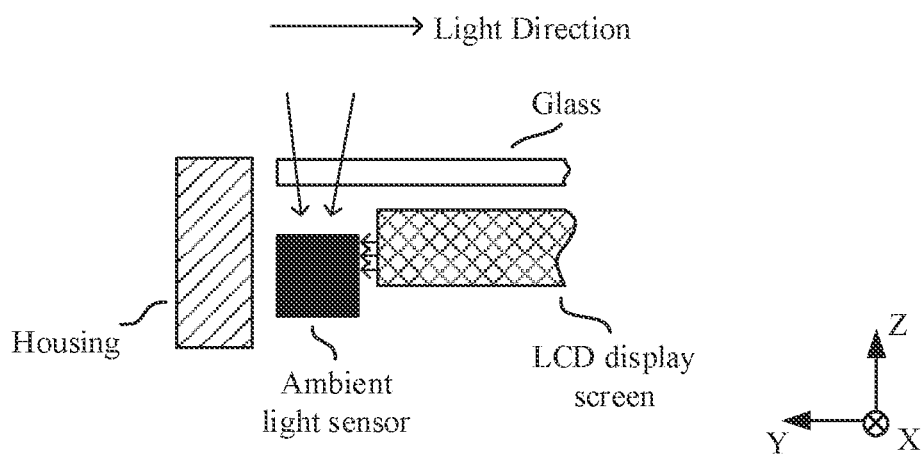
FIG. 3 is a schematic diagram of operation of an ambient light sensor.

However, in an actual operation process of the structure shown in FIG. 2, as shown in FIG. 3, a part (such as leaked light of the LCD screen) of light emitted from the LCD screen is also received by the ambient light sensor. In this case, the light received by the ambient light sensor may include both the leaked light of the LCD screen and the ambient light. Therefore, the output value of the ambient light sensor cannot accurately identify the intensity of the ambient light.

Currently, there is a solution of an under-screen ambient light sensor to detect ambient light by an ambient light sensor. For example, referring to FIG. 4, the ambient light sensor may be disposed below the screen. An operation mechanism of the under-screen ambient light sensor is described below with reference to FIG. 5. As shown in FIG. 5, ambient light may pass through the glass and the screen (such as an organic light-emitting diode (OLED) screen) to be incident on the ambient light sensor, so that the ambient light sensor makes a response to received light to obtain a corresponding output value. It can be understood that, because the ambient light sensor is located below the OLED screen, during display performed by the OLED screen, the light received by the ambient light sensor may include both light 1 emitted from the OLED screen and light 2 obtained after the ambient light passes through the glass and the OLED screen. In other words, in this embodiment of this application, the output value of the ambient light sensor corresponds to the sum of the light 1 and the light 2.

Figure 4:
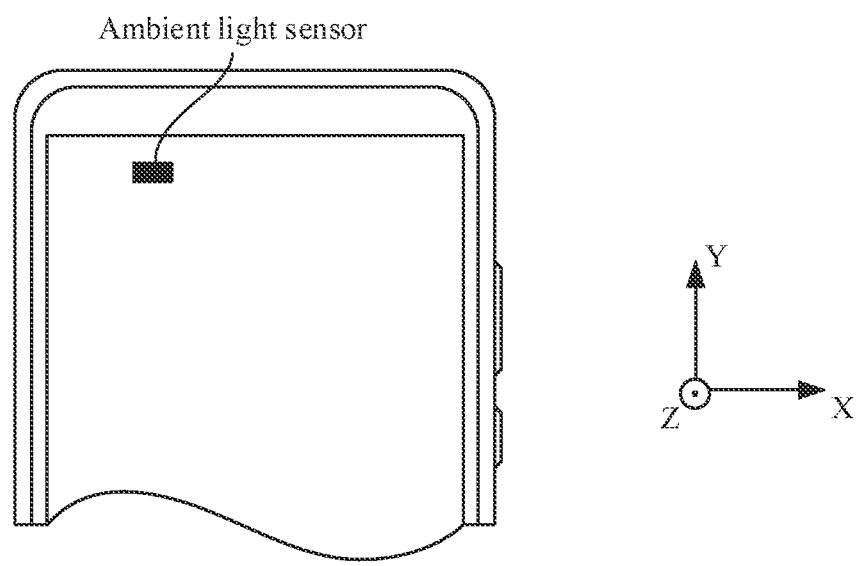
FIG. 4 is a schematic diagram of an arrangement of an ambient light sensor.
Figure 5:
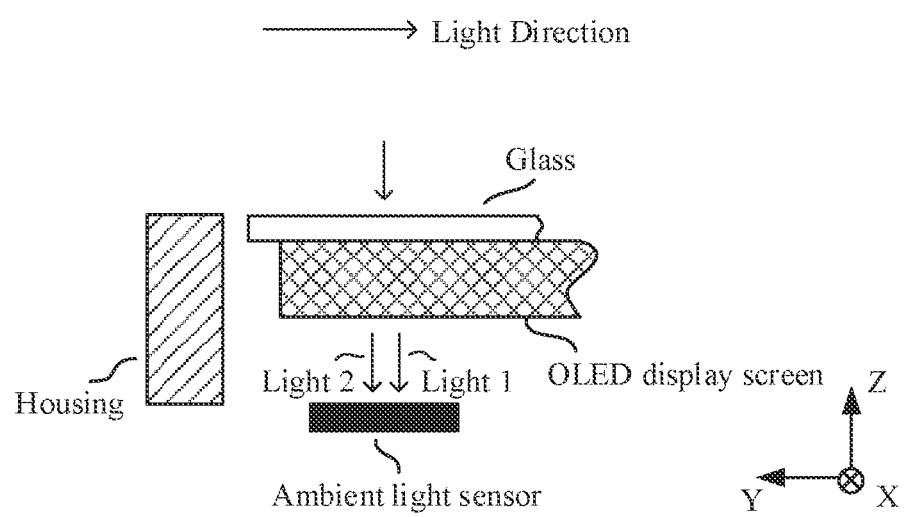
FIG. 5 is a schematic diagram of operation of an ambient light sensor.

To accurately obtain intensity of the ambient light, based on the description of FIG. 4 or FIG. 5, the mobile phone may determine, through calculation, an impact made on the ambient light sensor by the light 1 emitted from the OLED screen, and subtract, from the output value of the ambient light sensor, the impact made on the ambient light sensor by the light 1 emitted from the OLED screen, to obtain intensity of the light 2 obtained after the ambient light passes through the glass and the OLED screen.

In other words, the mobile phone needs to perform additional calculation to obtain the intensity of the ambient light. However, as a screen display refresh rate increases, when each frame of image is displayed, leaked screen light has different impacts on detection of the intensity of the ambient light performed by the ambient light sensor. Therefore, the mobile phone needs to perform more calculation to eliminate the impact of the leaked screen light, to obtain accurate intensity of the ambient light. In addition, to provide a user with better display experience, the screen is developed, which causes reduction in screen transmittance. As a result, a proportion of the ambient light in light received by the ambient light sensor is becoming lower, which also affects accuracy of obtaining the intensity of the ambient light by the mobile phone. It should be noted that, for the LCD screen, the mobile phone can perform additional calculation to eliminate the impact of the leaked screen light of the LCD from the ambient light sensor by using a corresponding algorithm. However, for the OLED screen, due to a difference between a light-emitting mechanism of the OLED and a light-emitting mechanism of the LCD, the impact of the leaked screen light of the OLED on the ambient light sensor is more complicated (for example, when the screen displays images of different colors, impacts on the ambient light sensor are different). Therefore, it is difficult to accurately and completely eliminate the impact of the leaked screen light of the OLED from the ambient light sensor through additional calculation.

To resolve the foregoing problem, the embodiments of this application provide an ambient light detection method, to prevent leaked screen light and/or screen transmittance from affecting ambient light detection, thereby implementing accurate ambient light detection and avoiding relatively high computational overheads caused to the electronic device.

The solutions provided in the embodiments of this application are described below in detail with reference to the accompanying drawings.

It should be noted that the ambient light detection method provided in the embodiments of this application may be applied to an electronic device of a user. The electronic device may be a device that needs to perform ambient light detection. For example, the electronic device may be a portable mobile device with a shooting function, such as a mobile phone, a tablet computer, a personal digital assistant (PDA), an augmented reality (AR) device\virtual reality (VR) device, or a media player. The electronic device may alternatively be a wearable electronic device such as a smart watch. A specific form of the device is not specially limited in the embodiments of this application.

Figure 6:
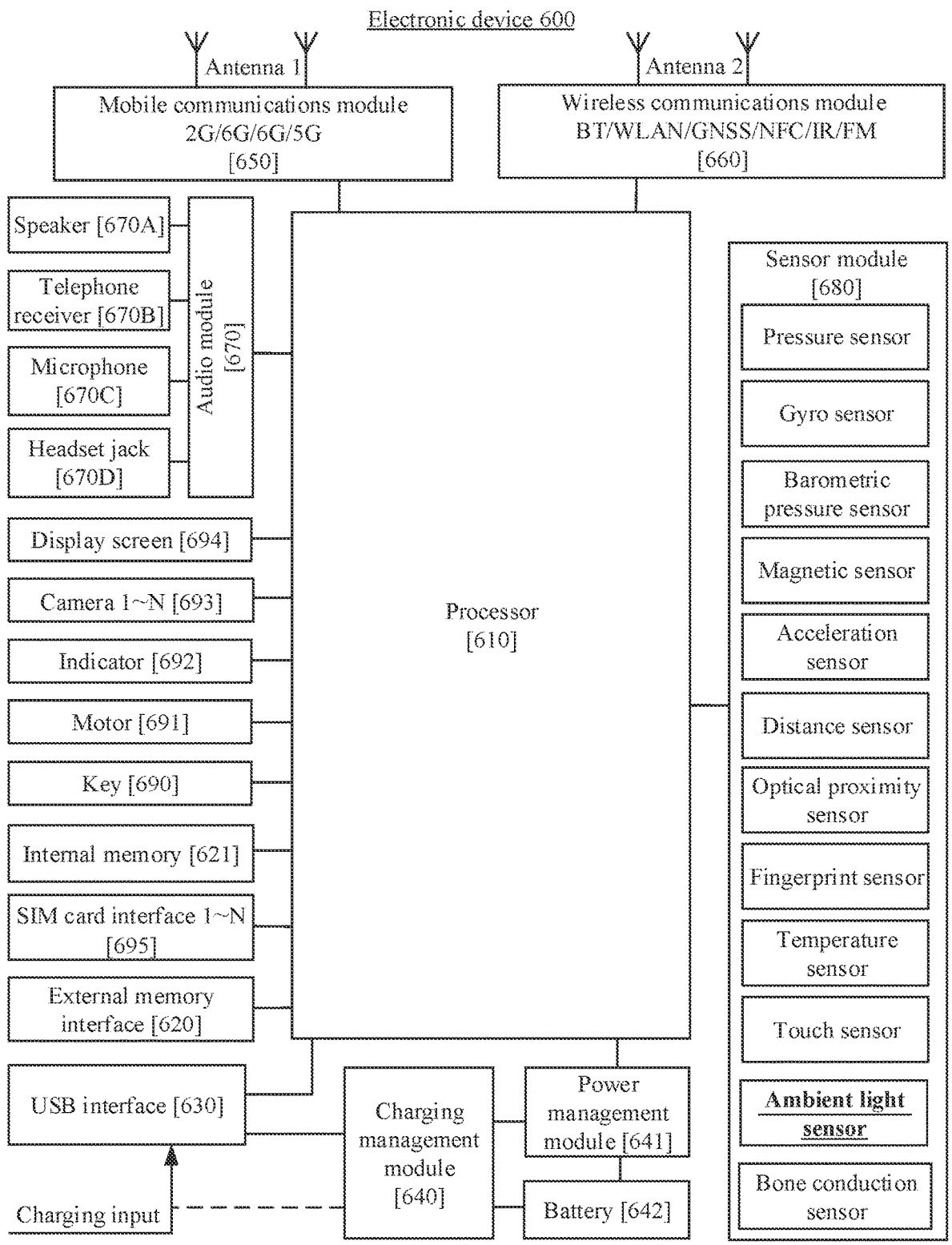
FIG. 6 is a schematic diagram of composition of an electronic device, according to an embodiment of this application.

FIG. 6 is a schematic diagram of a structure of an electronic device 400 according to an embodiment of this application.

As shown in FIG. 6, the electronic device 600 may include a processor 610, an external memory interface 620, an internal memory 621, a universal serial bus (USB) interface 630, a charging management module 640, a power management module 641, a battery 642, an antenna 1, an antenna 2, a mobile communications module 650, a wireless communications module 660, an audio module 670, a speaker 670A, a telephone receiver 670B, a microphone 670C, a headset jack 670D, a sensor module 680, a key 690, a motor 691, an indicator 692, a camera 693, a display screen 694, a subscriber identification module (SIM) card interface 695, and the like. The sensor module 680 may include a pressure sensor, a gyro sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

It can be understood that the structure illustrated in this embodiment does not constitute a specific limitation on the electronic device 600. In some other embodiments, the electronic device 600 may include more or fewer components than those shown in the figure, or combine some components, or split some components, or have different component arrangements. The components shown in the figure may be implemented by hardware, software, or a combination of the software and the hardware.

The processor 610 may include one or more processing units. For example, the processor 610 may include an application processor (AP), a modem processor, a graphics processing unit (GPU), an image signal processor (ISP), a controller, a memory, a video codec, a digital signal processor (DSP), a baseband processor, and/or a neural-network processing unit (NPU), and the like. Different processing units may be independent devices or may be integrated in one or more processors 610. In some embodiments, the processor 610 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The electronic device 600 may implement a shooting function by using the ISP, the camera 693, the video codec, the GPU, the display screen 694, the application processor, and the like.

The digital signal processor is configured to process a digital signal, and may process another digital signal in addition to a digital image signal For example, when the electronic device 600 selects a frequency, the digital signal processor is configured to perform Fourier transform or the like on frequency energy.

The video codec is configured to compress or decompress a digital video. The electronic device 600 can support one or more video codecs. In this way, the electronic device 600 can play or record videos in various encoding formats, such as moving picture experts group (MPEG) 1, MPEG 2, MPEG 3, and MPEG 4.

The NPU is a neural-network (NN) computing processor and performs fast processing on input information by referring to a structure of a biological neural network, for example, by referring to a mode of transmission between neurons in a human brain; and may further continuously perform self-learning. Applications such as intelligent recognition of the electronic device 600 can be implemented by using the NPU, for example, image recognition, facial recognition, speech recognition, and text understanding.

The charging management module 640 is configured to receive charging input from a charger. The charger may be a wireless charger or a wired charger. The power management module 641 is configured to connect the battery 642 and the charging management module 640 to the processor 610.

A wireless communications function of the electronic device 600 may be implemented by using the antenna 1, the antenna 2, the mobile communications module 650, the wireless communications module 660, the modem processor 610, the baseband processor 610, and the like.

The electronic device 600 implements a display function by using the GPU, the display screen 694, the application processor 610, and the like. The GPU is a microprocessor for image processing, and is connected to the display screen 694 and the application processor. The GPU is configured to perform mathematical and geometric calculation and is used for image rendering. The processor 610 may include one or more GPUs that execute program instructions to generate or change display information.

The external memory interface 620 may be configured to connect to an external storage card, such as a Micro SD card, to extend a storage capability of the electronic device 600. The external storage card communicates with the processor 610 through the external memory interface 620, to implement a data storage function. For example, files such as music and a video are stored in an external storage card.

The internal memory 621 may be configured to store computer-executable program code, and the executable program code includes instructions. The processor 610 runs the instructions stored in the internal memory 621 to perform various functional applications and data processing of the electronic device 600. The internal memory 621 may include a program storage area and a data storage area.

The electronic device 600 can implement an audio function such as music playing and recording by using the audio module 670, the speaker 670A, the telephone receiver 670B, the microphone 670C, the headset jack 670D, the application processor 610, and the like.

The touch sensor is also referred to as a "touch panel". The touch sensor may be disposed on the display screen 694. The touch sensor and the display screen 694 constitute a touchscreen, which is also referred to as a "touchscreen". The touch sensor is configured to detect a touch operation performed on or near the touch sensor. The touch sensor can transmit the detected touch operation to the application processor, to determine a touch event type.

The pressure sensor is configured to sense a pressure signal, and may convert the pressure signal into an electrical signal. In some embodiments, the pressure sensor may be disposed on the display screen 694.

As shown in FIG. 6, in this embodiment of this application, the ambient light sensor may be further disposed in the electronic device 600, to sense brightness of ambient light.

All ambient light detection methods provided in the embodiments of this application can be applied to an electronic device with the composition shown in FIG. 6.

The ambient light detection solutions provided in the embodiments of this application can be used to accurately determine an impact caused by leaked screen light when an ambient light detection unit disposed in an electronic device detects ambient light, and take out the impact of the leaked screen light from output of the ambient light detection unit through calculation, to obtain an accurate ambient light detection result. In contrast to the solution shown in FIG. 3 or FIG. 4 in which the mobile phone calculates and determines an impact of leaked screen light based on a display situation of each frame of image on the screen, in an embodiment of this application, the foregoing effect can be achieved by arranging two ambient light detection units. For example, the two ambient light detection units may include a first ambient light detection unit and a second ambient light detection unit. In an ambient light detection process, the first ambient light detection unit may be configured to receive ambient light and leaked screen light, and the second ambient light detection unit may be configured to receive the leaked screen light. An electronic device may accurately strip, based on a response made by the second ambient light detection unit to the leaked screen light and with reference to a calibration coefficient (such as a dark field calibration coefficient and a bright field calibration coefficient) determined through calibration, an impact of the leaked screen light from a response made by the first ambient light detection unit, to obtain an accurate ambient light detection result.

It should be understood that the ambient light detection unit in this embodiment of this application may be implemented by an apparatus or a component with an ambient light detection function. For example, the ambient light detection unit may be an ambient light sensor. For ease of description, this embodiment of this application is described below by using an example in which the first ambient light detection unit is a primary ambient light sensor and the second ambient light detection unit is an auxiliary ambient light sensor.

Figure 7:
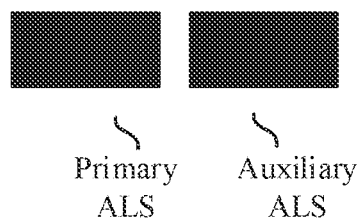
FIG. 7 is a schematic diagram of composition of an ambient light sensor, according to an embodiment of this application.

For example, in this embodiment of this application, as shown in FIG. 7, a primary ambient light sensor (a primary ALS for short) and an auxiliary ambient light sensor (an auxiliary ALS for short) may be configured in an electronic device. The primary ALS may be configured to receive first light (including ambient light and leaked screen light), and the auxiliary ALS may be mainly configured to receive second light (including the leaked screen light). The electronic device may obtain intensity of the ambient light through calculation based on the primary ALS, the auxiliary ALS, and a calibration coefficient. In this embodiment of this application, the calibration coefficient may include a dark field calibration coefficient K and a bright field calibration coefficient a. The dark field calibration coefficient may be used to identify a difference between responses made by the primary ALS and the auxiliary ALS to the leaked screen light, and the bright field calibration coefficient a may be used to identify a difference between responses made by the primary ALS and the auxiliary ALS to the ambient light.

It should be noted that in some implementations, in order that leaked screen light received by the auxiliary ALS is approximate or equal to leaked screen light received by the primary ALS, the primary ALS and the auxiliary ALS may be disposed close to each other. For example, a distance between a photosensitive surface of the primary ALS and a photosensitive surface of the auxiliary ALS is controlled not to exceed 3 mm.

In some embodiments, a film may be coated on glass above (for example, in a positive direction of a Z-axis) the primary ALS and/or the auxiliary ALS, to change transmission features of the ambient light passing through the glass in different areas, so that the primary ALS receives the ambient light and the leaked screen light, and the auxiliary ALS mainly receives the leaked screen light. It should be understood that in this embodiment of this application, the film is coated on the glass to implement different processing on light incident on the primary ALS and the auxiliary ALS. In some other embodiments of this application, ink generating different transmittance for the ambient light (such as white light) may be deployed on the glass, so that the ambient light can pass through the glass and the ink to be incident on the primary ALS. Correspondingly, the ambient light may be reflected at a corresponding position at which the ink is deployed on the auxiliary ALS, so that the auxiliary ALS does not receive (or basically does not receive) the ambient light. In a possible implementation, ink deployed corresponding to the primary ALS may be transparent black ink, and ink deployed corresponding to the auxiliary ALS may be opaque ink.

Figure 8:
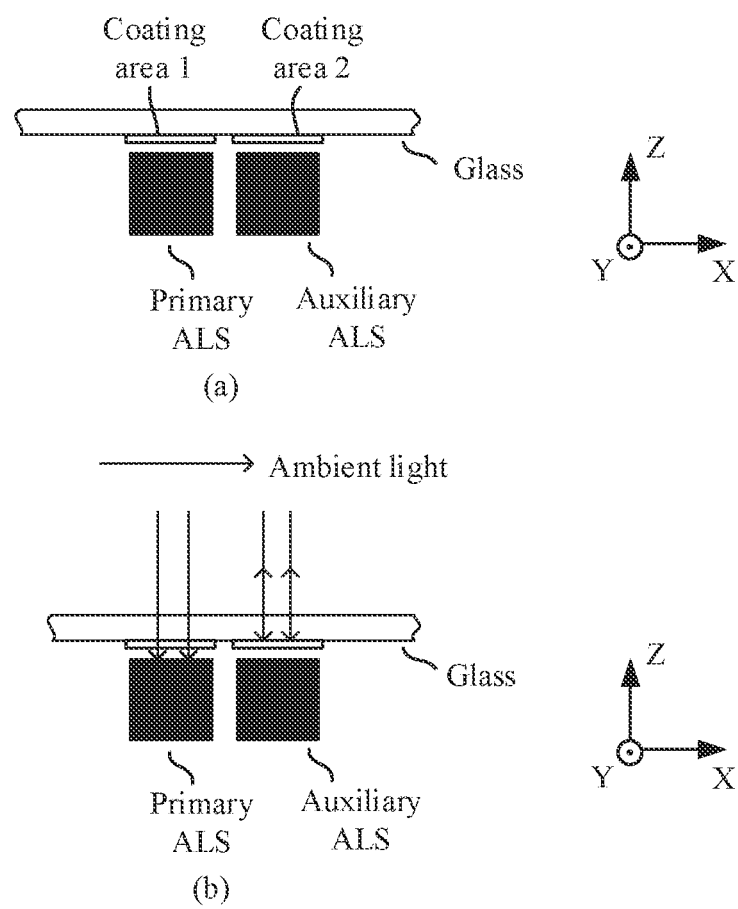
FIG. 8 is a schematic diagram of an ambient light sensor, according to an embodiment of this application.

For example, with reference to FIG. 8, as shown in (a) in FIG. 8, a coating area 1 may be formed above the primary ALS through coating, and a coating area 2 may be formed above the auxiliary ALS through coating. When light passes through the glass (or referred to as a glass cover), as shown in (b) in FIG. 8, the ambient light may be transmitted in the coating area 1 to be incident on the primary ALS, so that the primary ALS receives the ambient light. In addition, the coating area 2 may reflect the ambient light, so that after passing through the glass, the ambient light is reflected in the coating area 2, rather than projected onto the auxiliary ALS. Therefore, the auxiliary ALS cannot receive the ambient light. When an image is displayed on a display screen, the auxiliary ALS can receive leaked screen light. It can be understood that, when the primary ALS operates and an image is displayed on the display screen, the primary ALS also receives the leaked screen light. Therefore, a light receiving effect shown in FIG. 9 can be achieved, that is, the primary ALS may receive the ambient light and the leaked screen light, and the auxiliary ALS may mainly receive the leaked screen light.

Figure 9:
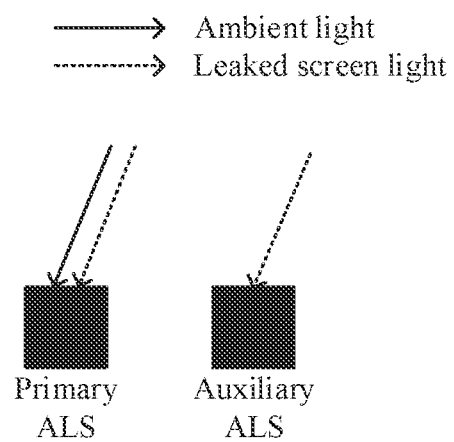
FIG. 9 is a schematic diagram of operation of an ambient light sensor, according to an embodiment of this application.

In the examples shown in FIG. 7 to FIG. 9, one primary ALS and one auxiliary ALS may be configured in the electronic device. A relative positional relationship between the primary ALS and the auxiliary ALS is not limited. For example, in the example of FIG. 7, a left ambient light sensor may be the primary ALS, and correspondingly, a right ambient light sensor is the auxiliary ALS. In some other examples, the left ambient light sensor may be the auxiliary ALS, and correspondingly, the right ambient light sensor is the primary ALS. In some embodiments, a distance between the primary ALS and the auxiliary ALS may be less than a preset threshold. For example, the preset threshold may be less than or equal to 3 mm. In this way, the leaked screen light that can be incident on the primary ALS is basically the same as the leaked screen light that can be incident on the auxiliary ALS, thereby improving accuracy of the solution provided in this embodiment of this application.

It should be noted that functions of the primary ALS and the auxiliary ALS may be integrated into a same component for implementation. Using one primary ALS and one auxiliary ALS as an example, functions of the primary ALS and the auxiliary ALS may be implemented by an ambient light sensor for which at least two photosensitive areas are configured. For example, one photosensitive area may be used to receive the ambient light and the leaked screen light, that is, implement a function of the primary ALS. The other photosensitive area may be mainly used to receive the leaked screen light, that is, implement a function of the auxiliary ALS.

Figure 10:
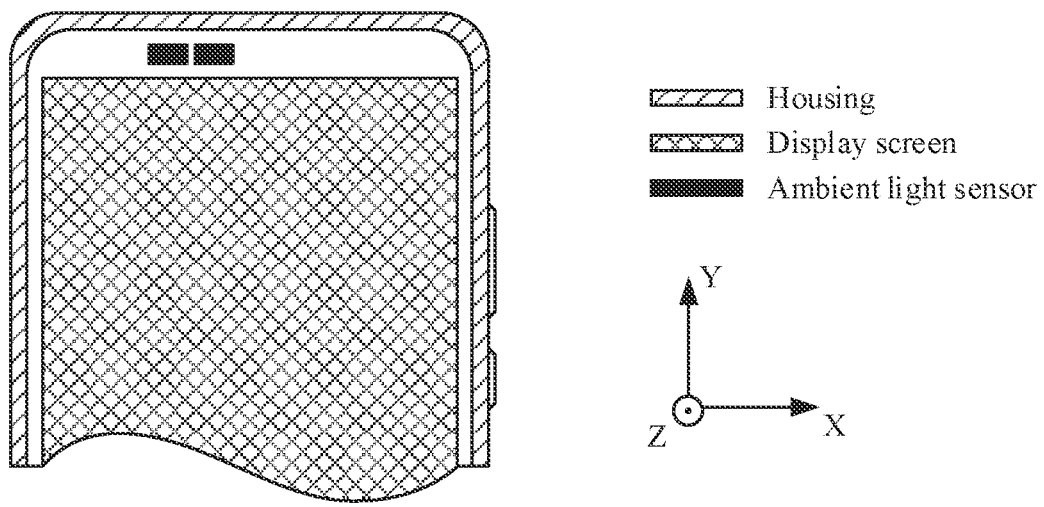
FIG. 10 is a schematic diagram of an arrangement of an ambient light sensor in an electronic device, according to an embodiment of this application.

In a possible implementation, for example, two ambient light sensors (such as one primary ALS and one auxiliary ALS) are disposed in an electronic device, and the electronic device is a mobile phone. FIG. 10 shows an example of a distribution position of an ambient light sensor according to an embodiment of this application. In the example of FIG. 10, both the primary ALS and the auxiliary ALS may be disposed in a gap between a display screen and a housing of the mobile phone. In this way, the primary ALS may receive ambient light through the gap.

Figure 11:
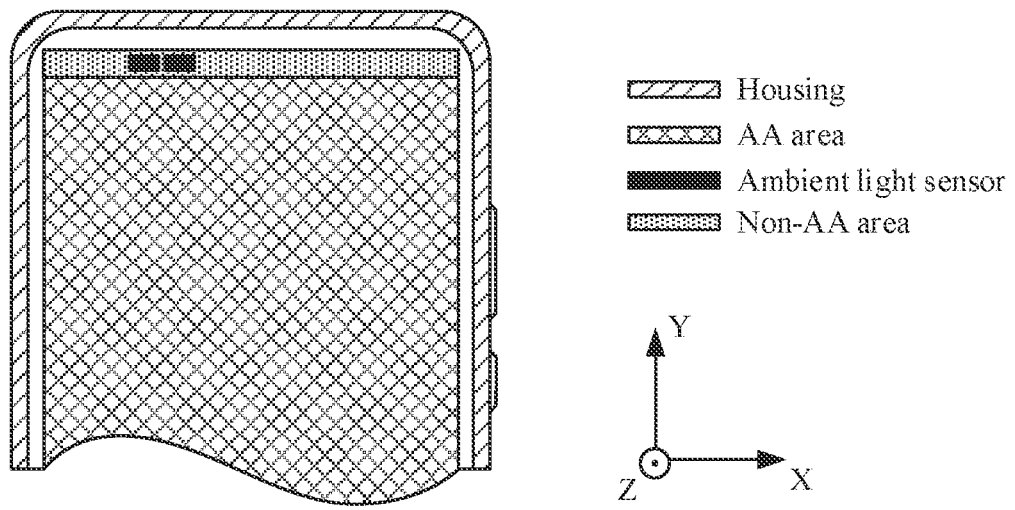
FIG. 11 is a schematic diagram of an arrangement of an ambient light sensor in an electronic device, according to an embodiment of this application.

In another possible implementation, for example, two ambient light sensors (such as one primary ALS and one auxiliary ALS) are still disposed in an electronic device, and the electronic device is still a mobile phone. FIG. 11 shows another example of a distribution position of an ambient light sensor according to this application. In this example, the ambient light sensor may also be disposed below the display screen. It can be understood that, when the display screen operates, the screen may include an active area (Active Area, AA area, or referred to as an operable area) and a non-AA area. In this example, the ambient light sensor may be disposed in a projection area of the non-AA area in a Z direction shown in the figure. In this way, when the primary ALS operates, ambient light may be incident on the primary ALS through the non-AA area on the display screen, so that the ALS detects the ambient light.

All the foregoing examples are described by using an example in which two ambient light sensors are located in a same position in an electronic device. For example, both the primary ALS and the auxiliary ALS may be located in the gap or below the screen (for example, below the non-AA area or the like). In some other embodiments of this application, the primary ALS and the auxiliary ALS may be located in different positions. For example, the primary ALS may be located in the gap, and the auxiliary ALS may be located below the screen, or the like.

In addition, all the foregoing examples are described by using an example in which two ambient light sensors are configured in an electronic device. In other embodiments, more primary ALSs and/or auxiliary ALSs may be configured in the electronic device. More ambient light sensors result in higher accuracy of detecting intensity of ambient light. In some implementations, when a plurality of ambient light sensors are configured in an electronic device, the primary ALS and the auxiliary ALS may be disposed at intervals.

Figure 12:
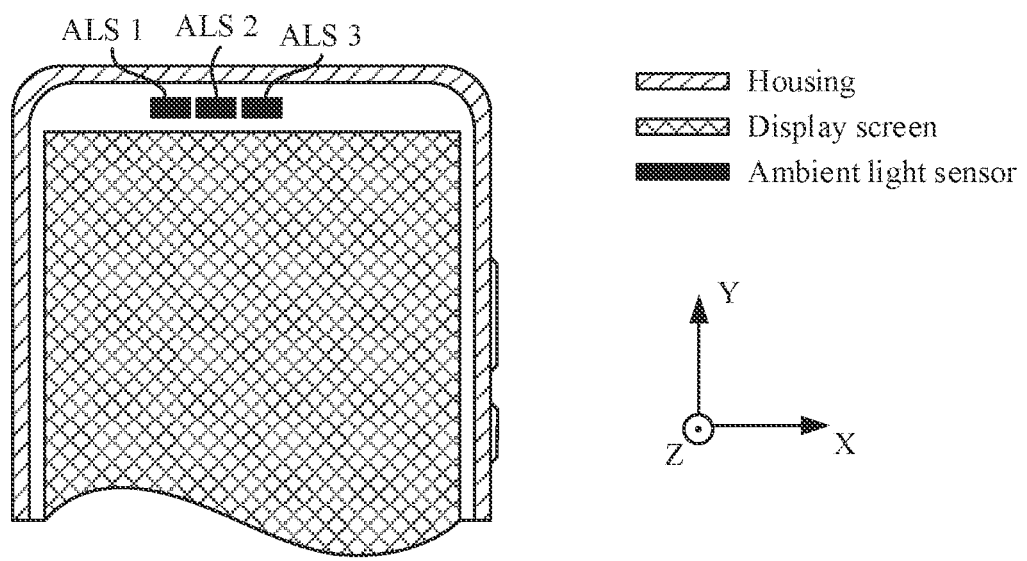
FIG. 12 is a schematic diagram of an arrangement of an ambient light sensor in an electronic device according to an embodiment of this application.

For example, two primary ALSs and one auxiliary ALS may be configured in the electronic device; or one primary ALS and two auxiliary ALSs may be configured in the electronic device. In an example, with reference to FIG. 12, three ambient light sensors (for example, an ALS 1, an ALS 2, and an ALS 3) are configured in an electronic device.

In this case, the ALS 1 and the ALS 3 may be primary ALSs, and correspondingly, the ALS 2 may be an auxiliary ALS. In some other implementations, the ALS 1 and the ALS 3 may be auxiliary ALSs, while the ALS 2 may be a primary ALS.

In the following descriptions, a description is first provided by using an example in which two ambient light sensors are disposed in an electronic device.

Figure 13:
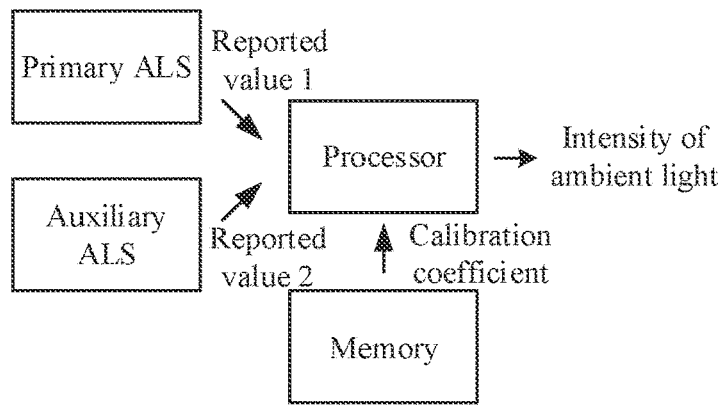
FIG. 13 is a schematic diagram of ambient light detection, according to an embodiment of this application.

For example, FIG. 13 is a schematic diagram of logic of ambient light detection according to an embodiment of this application. As shown in FIG. 13, when ambient light detection is performed, both a primary ALS and an auxiliary ALS can make corresponding responses based on received light, to obtain reported values respectively corresponding to the primary ALS and the auxiliary ALS. For example, the primary ALS may make a corresponding response based on received ambient light and leaked screen light, to obtain a first value. The auxiliary ALS may make a corresponding response based on received leaked screen light, to obtain a second value.

The primary ALS and the auxiliary ALS may respectively transmit the reported values (such as the first value and the second value) to a processor of the electronic device, so that the processor determines intensity of the ambient light based on the first value and the second value. In this embodiment of this application, the processor may determine current intensity of the ambient light based on a calibration coefficient in the electronic device with reference to the first value and the second value. In some embodiments, as shown in FIG. 13, the calibration coefficient may be stored in a memory of the electronic device. The electronic device may read the calibration coefficient from the memory when the calibration coefficient is required to use. In some other embodiments of this application, the calibration coefficient may be stored in a cloud or set by a user. The following embodiments are described by using an example in which the calibration coefficient is stored in the memory in advance.

It can be understood that in this example, the calibration coefficient may be obtained by using a calibration process.

A manner of obtaining a calibration coefficient is described below by using an example in which two ambient light sensors (such as a primary ALS and an auxiliary ALS) are configured in an electronic device.

Figure 14:
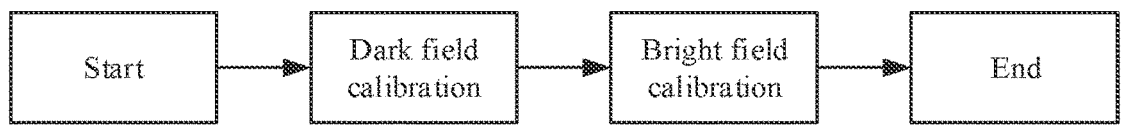
FIG. 14 is a schematic diagram of calibration, according to an embodiment of this application.

For example, as shown in FIG. 14, in this example, a calibration process of obtaining a calibration coefficient (for example, including a dark field calibration coefficient K and a bright field calibration coefficient a) may include the following four steps.

Step 1: Start.

A corresponding calibration program may be configured in the electronic device, so that the electronic device can perform calibration processes in the following steps in cooperation with the steps. In addition, through the calibration program, the electronic device may further store results obtained by using step 2 (such as dark field calibration) and step 3 (such as bright field calibration), so as to obtain, through calculation based on a result of the dark field calibration and a result of the bright field calibration, a calibration coefficient corresponding to the electronic device.

Step 2: Perform Dark Field Calibration.

In this step, the electronic device may obtain the dark field calibration coefficient K through the dark field calibration.

In the dark field calibration process, the electronic device may be in a dark field environment. The dark field environment may be an environment in which intensity of ambient light is 0. In other words, in the dark field calibration process, there is no light outside. In some embodiments, the electronic device may determine that a current environment is a dark field environment in the following manners. For example, the electronic device may control backlight brightness of a display screen to be 0, that is, the display screen is off. When the disposed primary ALS and/or the disposed auxiliary ALS start/starts operating, the electronic device may obtain reported values of the ambient light sensors. When a reported value of the primary ALS and/or a reported value of the auxiliary ALS are/is less than a preset threshold (such as a dark field threshold), it is determined that the current environment is a dark field environment.

It can be understood that, with reference to the foregoing description, both the primary ALS and the auxiliary ALS may be configured to receive light. The primary ALS can receive ambient light. Therefore, in the dark field environment, intensity of the ambient light received by the primary ALS is approximate to 0. In addition, because the display screen is off, there is no leaked screen light. To be specific, when the reported value of the primary ALS is less than the dark field threshold, it indicates that intensity of light (for example, ambient light) received by the primary ALS is extremely weak, and it indicates that the current environment is a dark field environment.

In some other embodiments, the electronic device may further accurately determine, based on the reported value of the auxiliary ALS, that the current environment is a dark field environment. It can be understood that, based on the description shown in FIG. 8, ideally, the auxiliary ALS cannot receive ambient light at all. However, in an actual implementation, because a distance between the primary ALS and the auxiliary ALS is extremely short (for example, the distance is within 3 mm shown in the foregoing example), it is difficult for the primary ALS and the auxiliary ALS to achieve complete light isolation, and the auxiliary ALS still receives a part of the ambient light. Therefore, in this example, it may also be determined, based on the reported value of the auxiliary ALS in the current environment, that the electronic device is currently in a dark field environment. For example, when the reported value of the auxiliary ALS is less than a corresponding dark field threshold, it indicates that intensity of light received by the auxiliary ALS is extremely weak. In addition, because the display screen is currently off, the intensity of the light received by the auxiliary ALS comes from only the ambient light. Therefore, it can be determined that the current environment is a dark field environment.

It should be noted that, in different implementations, the dark field threshold corresponding to the primary ALS and the dark field threshold corresponding to the auxiliary ALS may be the same or different.

In some other embodiments of this application, it may be determined, with reference to the reported values of the primary ALS and the auxiliary ALS, that the current environment is a dark field environment. For example, when the reported value of the primary ALS is less than the dark field threshold corresponding to the primary ALS and the reported value of the auxiliary ALS is less than the dark field threshold corresponding to the auxiliary ALS, the electronic device may determine that the current environment is a dark field environment. Correspondingly, when the reported value of the primary ALS is greater than the dark field threshold corresponding to the primary ALS or the reported value of the auxiliary ALS is less than the dark field threshold corresponding to the auxiliary ALS, the electronic device may determine that ambient light still exists in the current environment, which does not meet a dark field requirement, so that the dark field calibration may be stopped.

The electronic device can start the dark field calibration immediately after determining that the current environment is a dark field environment.

It can be understood that, due to impacts of an environment and a position, even if the primary ALS and the auxiliary ALS are same sensors, responses (for example, the reported values) of the primary ALS and the auxiliary ALS may be different in a same lighting environment. Therefore, in this example, the dark field calibration coefficient may be determined through the dark field calibration by using leaked screen light as a single light source. The dark field calibration coefficient may be used to identify a difference between light perception of the primary ALS and light perception of the auxiliary ALS. For example, the dark field calibration coefficient may be identified by using a ratio of the reported value of the primary ALS to the reported value of the auxiliary ALS.

Figure 15:
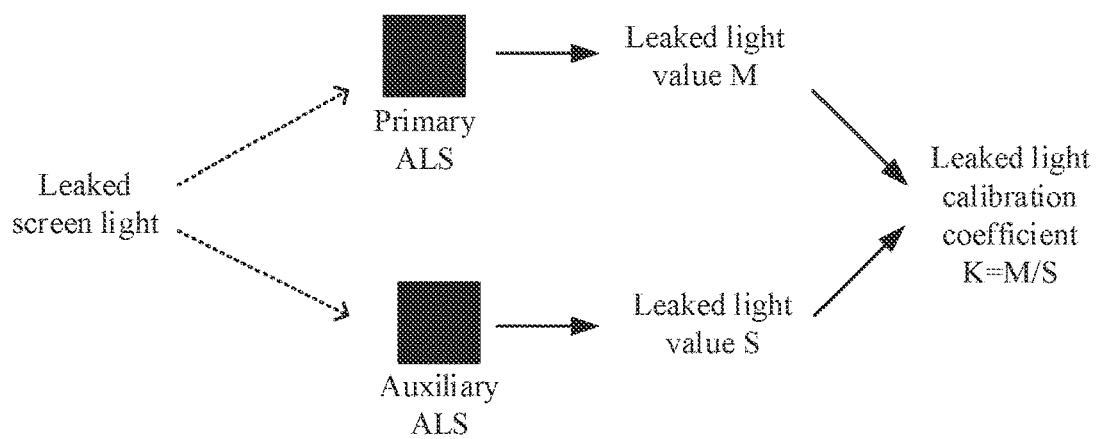
FIG. 15 is a schematic diagram of dark field calibration, according to an embodiment of this application.

In some embodiments, with reference to FIG. 15, the electronic device may control the display screen to display a first interface. The first interface may be a single-color interface. For example, the first interface is a white interface. In this case, both the primary ALS and the auxiliary ALS can receive leaked screen light that occurs when the display screen displays white. The electronic device may further obtain reported values that are respectively corresponding to the primary ALS and the auxiliary ALS. For example, the reported value of the primary ALS is a third value, and the reported value of the auxiliary ALS is a fourth value. Based on this, the dark field calibration coefficient can be obtained. For example, in the dark field calibration process, the third value is M and the fourth value is S. In this case, the dark field calibration coefficient K may be determined according to the following formula (1):

$$K = M/S \qquad \text{Formula (1)}$$

In some other embodiments, the electronic device may further control the display screen to display other colors (for example, display a second interface different from the first interface, where the second interface may be a single-color interface with a color different from a color of the first interface), to obtain a more accurate dark field calibration coefficient. For example, the electronic device may display the second interface after completing the dark field calibration based on the first interface. The electronic device obtains a fifth value reported by the primary ALS and a sixth value reported by the auxiliary ALS. The electronic device can obtain, through calculation based on the fifth value and the sixth value, a dark field calibration coefficient corresponding to a current interface color.

Figure 17:
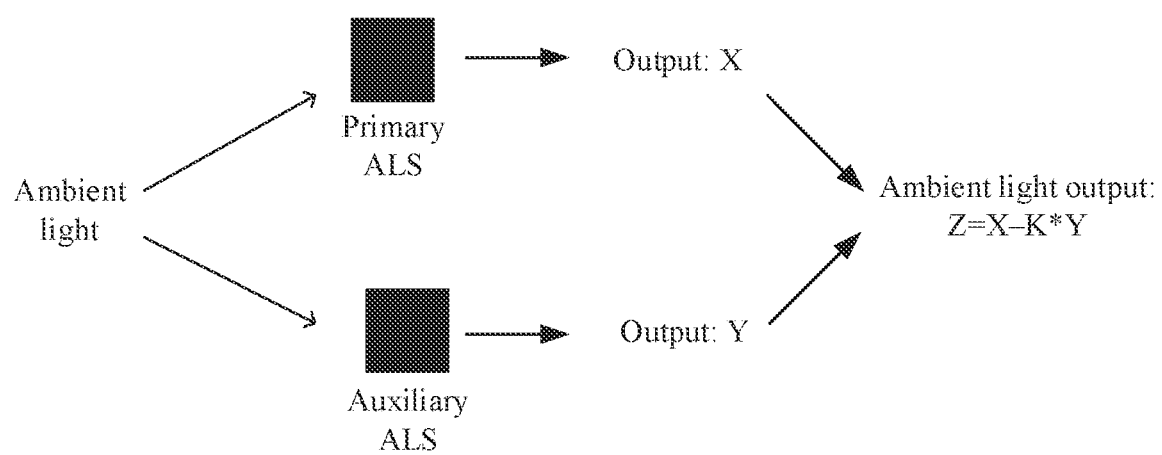
FIG. 17 is a schematic diagram of bright field calibration, according to an embodiment of this application.

It can be understood that responses made by an ambient light sensor to light of different frequencies (that is, light of different colors or wavelengths) are usually different. In addition, transmittance of a screen and that of a uniform light film material may also be different for light of different frequencies. Therefore, in an actual operation process, when the display screen displays images of different colors, dark field calibration coefficients may be different. For example, as shown in FIG. 17, in an environment with light of a same frequency, a difference between responses of the primary ALS and the auxiliary ALS is approximate to a constant ratio (for example, the ratio is identified by using the dark field calibration coefficient). However, in an environment with light of different frequencies (such as red light and blue light), ratios of the difference between the responses of the primary ALS and the auxiliary ALS may be different.

In this example, precision of an obtained dark field calibration coefficient may be increased through dark field calibration performed by using images of a plurality colors.

For example, in addition to performing the dark field calibration in the foregoing example (that is, the display screen is controlled to display white), the electronic device may separately repeat the dark field calibration process shown in FIG. 15 when other colors are displayed, and obtain dark field calibration coefficients that are separately corresponding to light of different frequencies in environments.

For example, the electronic device separately displays white, red, green, and blue. The electronic device may obtain a dark field calibration coefficient K1 when displaying a white interface. The electronic device may obtain a dark field calibration coefficient K2 when displaying a red interface. The electronic device may obtain a dark field calibration coefficient K3 when displaying a green interface. The electronic device may obtain a dark field calibration coefficient K4 when displaying a blue interface. Then, based on dark field calibration coefficients in different scenarios, the electronic device can determine a dark field calibration result (such as K0) obtained after comprehensive judgment. For example, K0=(K1+K2+K3+K4)/4.

In this way, the electronic device can obtain the dark field calibration coefficient. In the following examples, that the dark field calibration coefficient K=M/S is used as an example.

Step 3: Perform Bright Field Calibration.

After completing the dark field calibration, the electronic device can obtain a difference between responses made by the primary ALS and the auxiliary ALS to a same lighting environment. Based on this, the electronic device can perform the bright field calibration, to obtain a relationship between a reported value obtained by an ambient light sensor and intensity of actual ambient light in an operation environment. In this example, the relationship between the reported value obtained by the ambient light sensor and the intensity of the actual ambient light may be identified by using a bright field calibration coefficient.

In an example, the electronic device may be in a fixed lighting environment during the bright field calibration. For example, a light source may be placed directly above a sensor of the electronic device. The electronic device may control the display screen to be off, that is, in the bright field calibration process, the display screen does not emit light, and there is no leaked screen light. In this example, during the bright field calibration, the light source may be set based on preset intensity, for example, intensity of the light source may be a target value L.

Figure 16:
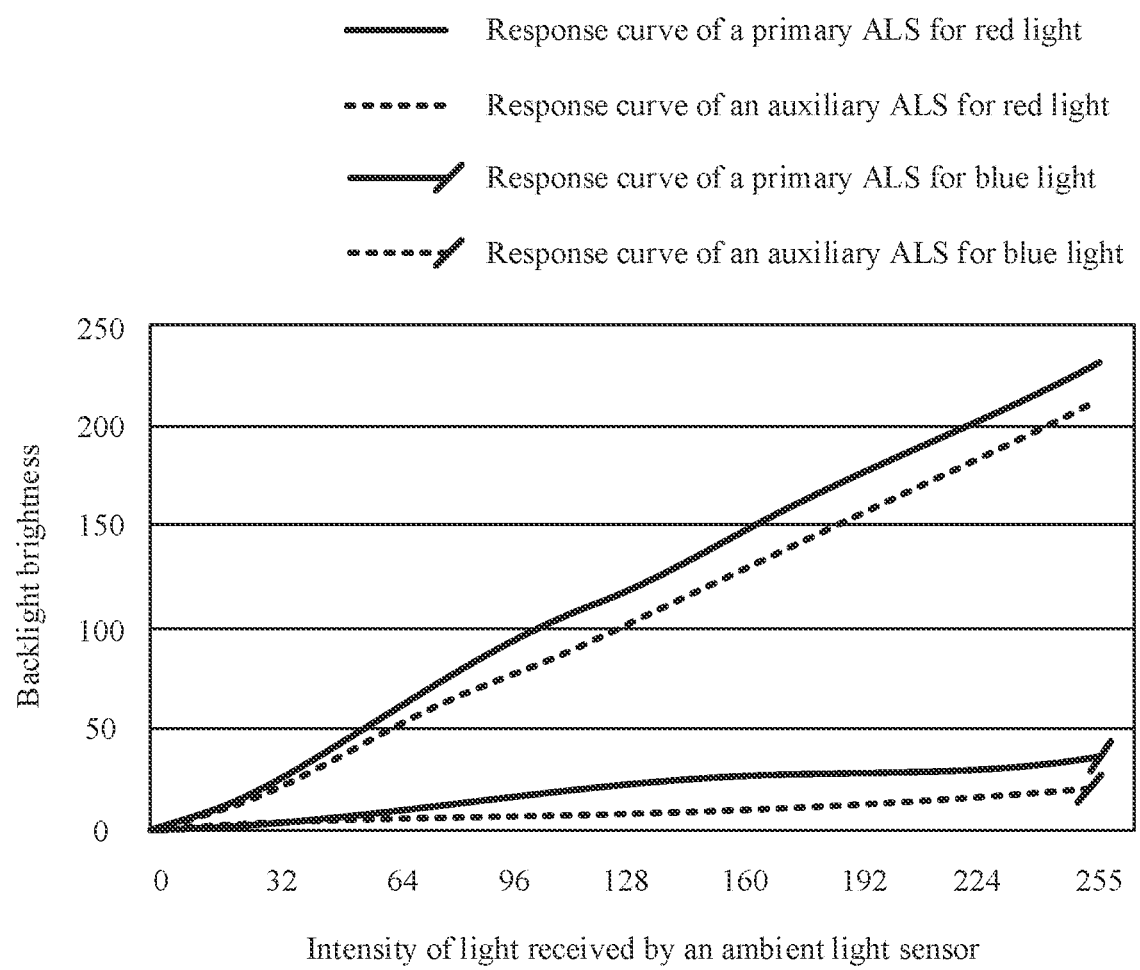
FIG. 16 is a schematic diagram of a difference between responses made to light of different wavelengths, according to an embodiment of this application.

In this environment, the electronic device may obtain reported values that are respectively corresponding to the primary ALS and the auxiliary ALS. For example, with reference to FIG. 16, the reported value of the primary ALS may be a seventh value (such as x), and the reported value of the auxiliary ALS may be an eighth value (such as y). With reference to the foregoing descriptions, in an ideal environment or when light is well isolated between the primary ALS and the auxiliary ALS, the auxiliary ALS can receive only leaked screen light and cannot receive external ambient light. In this case, the reported value of the auxiliary ALS is y=0 in the bright field calibration process. However, generally, the auxiliary ALS also receives a part of the ambient light, and therefore the reported value of the auxiliary ALS is y>0 in the bright field calibration process.

The electronic device may determine an output value Z of the primary ALS for the ambient light in the current bright field environment based on the reported value x of the primary ALS and the reported value of the auxiliary ALS with reference to the dark field calibration coefficient K obtained in the dark field calibration. In this application, the output value Z may also be referred to as a first response value. For example, Z may be obtained according to the following formula (2):

$$Z = x - K \times y \qquad \text{Formula (2)}$$

In this way, the electronic device can complete the bright field calibration. Therefore, the obtained value Z may also be referred to as the bright field calibration coefficient. For example, the bright field calibration coefficient may be an output value of the sensor that is obtained in the current bright field environment. It can be understood that the output value Z of the sensor may correspond to intensity of the ambient light in the current bright field calibration environment. Therefore, a calibration coefficient a in a bright field (that is, a normal operation environment) can be determined based on the output value and the intensity of the ambient light in the current environment. For example, the calibration coefficient a may be determined according to the following formula (3):

$$a = L/Z = L/(x - K \times y) \qquad \text{Formula (3)}$$

Step 4: End.

Through step 1 to step 3, the electronic device can complete most of the calibration process and obtain the dark field calibration coefficient K and the bright field calibration coefficient a. In some embodiments, the electronic device may store calibration results (such as the dark field calibration coefficient K and the bright field calibration coefficient a) in a memory of the electronic device, so that when intensity of ambient light needs to be determined, a processor of the electronic device can invoke the calibration coefficients (such as the dark field calibration coefficient K and the bright field calibration coefficient a) in the memory, to obtain accurate intensity of ambient light through calculation.

It can be understood that the dark field calibration coefficient and the bright field calibration coefficient that are obtained in the process of performing calibration based on the foregoing step 1 to step 4 may be used to identify a difference between responses made by the primary ALS and the auxiliary ALS to received light. For products with a same design, dark field calibration coefficients and bright field calibration coefficients are not significantly different. Therefore, in some embodiments of this application, it may also be determined, based on the dark field calibration coefficient and/or the bright field calibration coefficient, whether an electronic device currently performing calibration has a problem, that is, a defective product is intercepted based on the dark field calibration coefficient and/or the bright field calibration coefficient.

For example, an effective interval of (such as a dark field calibration interval) the dark field calibration coefficient and an effective interval (such as a bright field calibration interval) corresponding to the bright field calibration coefficient may be configured in the electronic device. When both the dark field calibration coefficient and the bright field calibration coefficient of the electronic device performing calibration fall within the corresponding effective intervals, it indicates that the electronic device does not need to be intercepted. Correspondingly, when the dark field calibration coefficient or the bright field calibration coefficient of the electronic device performing calibration is beyond the corresponding effective interval, it indicates that the electronic device has a problem, and the electronic device may be intercepted to confirm the problem.

Figure 18:
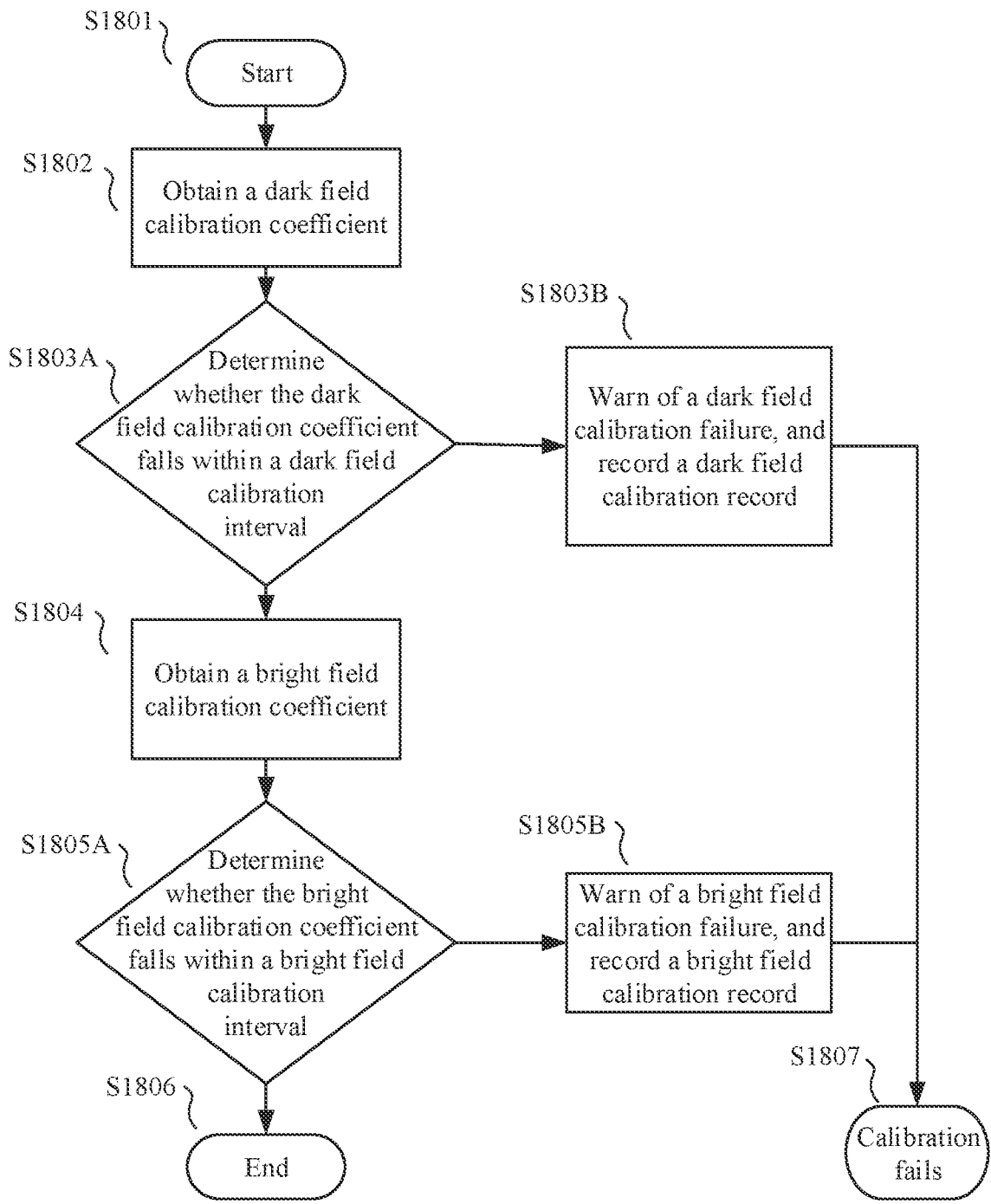
FIG. 18 is a schematic diagram of logic of a calibration process, according to an embodiment of this application.

In an example, FIG. 18 is a schematic diagram of a procedure for intercepting a defective product based on a dark field calibration coefficient and a bright field calibration coefficient. As shown in FIG. 18, the solution may include the following steps.

S1801. Start.

For execution of this process, refer to the description of step 1 shown in FIG. 14. Details are not described herein again.

S1802. Obtain a dark field calibration coefficient.

For execution of this process, refer to the description of step 2 shown in FIG. 14. Details are not described herein again.

S1803A. Determine whether the dark field calibration coefficient falls within a dark field calibration interval.

In this example, after obtaining the dark field calibration coefficient K, an electronic device may determine execution of subsequent calibration based on whether the dark field calibration coefficient falls within the dark field calibration interval.

For example, when the dark field calibration coefficient K falls within the dark field calibration interval, it indicates that current dark field calibration of the electronic device is normally performed, and subsequent operations may continue to be performed, for example, S1804 may be performed. Correspondingly, when the dark field calibration coefficient K is beyond the dark field calibration interval, it indicates that a result of the current dark field calibration of the electronic device is abnormal. In this case, the electronic device may stop the current calibration process, and the electronic device is intercepted.

In some embodiments, the electronic device may perform S1803B when determining that the current dark field calibration of the electronic device is abnormal, that is, warn of a dark field calibration failure, and record a dark field calibration record. In some implementations, the dark field calibration record may include at least one of the following information: a reported value of a primary ALS, a reported value of an auxiliary ALS, the dark field calibration coefficient K, and upper and lower thresholds of the dark field calibration interval (that is, upper and lower endpoint values of the dark field calibration interval). Then, the electronic device can end the calibration, for example, perform S1807 to display a calibration failure. In this way, a current problem of the electronic device can be located and analyzed based on the dark field calibration record. For example, the dark field calibration coefficient value K may be beyond the dark field calibration interval due to the following reasons: light-averaging ink has a poor light-averaging effect, foreign objects, such as overflowing glue, block a photosensitive area, tolerance at a device welding position or tolerance of assembly is excessively large, or a sensor is abnormal. Therefore, a defective product can be intercepted in the dark field calibration process.

The electronic device may perform S1804 when succeeding in the dark field calibration.

S1804. Obtain a bright field calibration coefficient.

For execution of this process, refer to the description of step 3 shown in FIG. 14. Details are not described herein again.

S1805A. Determine whether the bright field calibration coefficient falls within a bright field calibration interval.

Similar to defective product interception in the dark field calibration process, in the bright field calibration process, a defective electronic device may be intercepted based on a relationship between the bright field calibration coefficient and the corresponding bright field calibration interval.

For example, when the bright field calibration coefficient falls within the bright field calibration interval, it indicates that the electronic device is not abnormal currently and does not need to be intercepted. For example, a subsequent S1806 is performed.

Correspondingly, when the bright field calibration coefficient is beyond the bright field calibration interval, it indicates that the current bright field calibration of the electronic device fails. For example, the electronic device may perform S1805B, that is, warn of a bright field calibration failure, and record a bright field calibration record. The bright field calibration record may include at least one of the following information: a reported value of a primary ALS, a reported value of an auxiliary ALS, the bright field calibration coefficient a, and upper and lower thresholds of the bright field calibration interval (that is, upper and lower endpoint values of the bright field calibration interval). Then, the electronic device can end the calibration, for example, perform S1807 to display a calibration failure.

In this way, a current problem of the electronic device can be located and analyzed based on the bright field calibration record. For example, the bright field calibration coefficient value a may be beyond the bright field calibration interval due to the following reasons: an ink area in a primary photosensitive area is excessively large or excessively small, foreign objects, such as overflowing glue, block a photosensitive area, tolerance at a device welding position or tolerance of assembly is excessively large, or a sensor is abnormal. Therefore, a defective product can be intercepted in the bright field calibration process.

S1806. End.

If both the bright field calibration process and the dark field calibration coefficient of the electronic device succeed, it indicates that the electronic device has no abnormality in the calibration process and does not need to be intercepted. The electronic device may store the bright field calibration coefficient and the dark field calibration coefficient for subsequent detection of intensity of ambient light.

It can be understood that, through the foregoing descriptions, a person skilled in the art can accurately understand execution details of the ambient light detection solutions provided in the embodiments of this application and the manner for obtaining the calibration coefficient used in the ambient light detection solutions. Based on the solutions, the electronic device can accurately detect ambient light without relatively high computational overheads.

A process of obtaining a calibration coefficient is described below by using an example.

In some embodiments, for example, two ambient light sensors (such as one primary ALS and one auxiliary ALS) are configured in an electronic device, and each ambient light sensor has a capability of detecting light on four channels of RGBC (namely, red light, green light, blue light, and visible light).

A calibration process is as follows.

Step (1): When the electronic device is in a dark room environment, a processor of the electronic device controls backlight brightness of a screen to be 0, that is, the screen is off. The primary ALS and the auxiliary ALS respectively report values. The processor determines, based on the reported values of the primary ALS and the auxiliary ALS and a preset dark field threshold, whether a current environment is a dark field environment; and starts dark field calibration when determining that the current environment is a dark field environment. The electronic device controls, by using the processor, the screen to display a pure white image, and proceeds to step (2).

Step (2): The primary ALS and the auxiliary ALS respectively report the values. In this example, each sensor may report a value on each of the four channels of RGBC. For example, reported values of the primary ALS on RGBC are sequentially M1, M2, M3, and M4. Similarly, reported values of the auxiliary ALS on the channels of RGBC are sequentially S1, S2, S3, and S4. The processor may obtain dark field calibration coefficients on the channels through calculation: $K1c=MT/S1$, $K2c=M2/S2$, $K3c=M3/S3$, and $K4c=M4/S4$.

Step (3): Determine whether all the dark field calibration coefficients (such as K1c to K4c) fall within a dark field calibration interval; and proceed to step (4) if all the dark field calibration coefficients fall within the dark field calibration interval; or if not all the dark field calibration coefficients fall within the dark field calibration interval, determine that the current calibration of the electronic device fails, prompt, through warning, a user that the dark field calibration is abnormal, and record a related log to end the calibration.

Step (4): The processor switches a pure-color image displayed on the screen to red, green, and blue, and repeats steps (2) and (3) to obtain reported values of the sensors and calculate corresponding dark field calibration coefficients, and determine whether the dark field calibration coefficients fall within the dark field calibration interval. For example, when the screen displays red, calculated dark field calibration coefficients on the four channels of RGBC are sequentially K1r, K2r, K3r, and K4r; when green is displayed, calculated dark field calibration coefficients are sequentially K1g, K2g, K3g, and K4g; and when blue is displayed, calculated dark field calibration coefficients are sequentially K1b, K2b, K3b, and K4b. The processor proceeds to step (5) if all the dark field calibration coefficients fall within the corresponding dark field calibration interval.

Step (5): Calculate average values of the dark field calibration coefficients on the four channels of RGBC, to obtain dark field calibration coefficients suitable for all the four channels of RGBC: $K1=(K1c+K1r+K1g+K1b)/4$, $K2=(K2c+K2r+K2g+K2b)/4$, $K3=(K3c+K3r+K3g+K3b)/4$, and $K4=(K4c+K4r+K4g+K4b)/4$; and store the four dark field calibration coefficients (such as K1, K2, K3, and K4) in a memory of the electronic device (such as a non-volatile storage medium), and then proceed to bright field calibration, that is, proceed to step (6).

Step (6): Transfer the electronic device to a bright field calibration environment, place the primary ALS and the auxiliary ALS of the electronic device directly below a calibration light source, control screen backlight to be off to ensure that the screen does not emit light, and light the calibration light source. Target light intensity corresponding to the calibration light source on the four channels of RGBC are respectively L1, L2, L3, and L4.

Step (7): The processor obtains reported values of each of the primary ALS and the auxiliary ALS on the channels. For example, the reported values of the primary ALS on the channels of RGBC are x1, x2, x3, and x4, and the reported values of the auxiliary ALS on RGBC are y1, y2, y3, and y4. Current reported values of the current electronic device on the channels of RGBC of equivalent ambient light are sequentially $z1=x1-K1 \times y1$, $z2=x2-K2 \times y2$, $z3=x3-K3 \times y3$, and $z4=x4-K4 \times y4$. The processor uses z1, z2, z3, and z4 to perform calibration and calculate bright field calibration coefficients on the channels of RGBC: $a1=L1/z1$, $a2=L2/z2$, $a3=L3/z3$, and $a4=L4/z4$.

Step (8): Determine whether the bright field calibration coefficients fall within a bright field calibration interval, and if the bright field calibration coefficients fall within the bright field calibration interval, store the bright field calibration coefficients in the non-volatile memory of the device; or if the bright field calibration coefficients do not fall within the bright field calibration interval, determine that the calibration of the electronic device fails, prompt, through warning, a user that the bright field calibration is abnormal, and record a related log.

Through step (1) to step (8), the dark field calibration coefficients K1 to K4 and the bright field calibration coefficients a1 to a4 can be obtained. These calibration coefficients may be stored in the memory. When the electronic device needs to detect intensity of ambient light, the electronic device may invoke the dark field calibration coefficients K1 to K4 and the bright field calibration coefficients a1 to a4 from the memory, to accurately calculate intensity of ambient light in a current environment.

Step (1) to step (8) provide a method for obtaining a calibration coefficient when one primary ALS and one auxiliary ALS are configured. A process of obtaining a calibration coefficient when one primary ALS and two auxiliary ALSs are configured in an electronic device is described below by using a specific example. In this example, the two auxiliary ALSs may be respectively two sides of the primary ALS. Therefore, one of the two auxiliary ALSs and the primary ALS can constitute an ambient light detection apparatus. Correspondingly, the other auxiliary ALS and the ALS can constitute an ambient light detection apparatus. Through operation of the two ambient light detecting apparatuses, accuracy of obtained intensity of ambient light can be improved.

For example, for simplicity of description, the primary ALS and the two auxiliary ALSs all are single channel ambient light sensors in the following. A process of obtaining a calibration coefficient in the scenario may include the following steps.

Step (a): When the electronic device is a dark room environment, a processor controls backlight brightness of a screen to be 0, that is, the screen is off, and obtains reported values of the primary ALS and the two auxiliary ALSs. If the reported values each are less than a specific dark field threshold, it is determined that the electronic device is in a dark field environment. The electronic device starts dark field calibration, controls, by using the processor, the screen of the electronic device to display a pure white image, and proceeds to step (b). If the reported values are not less than the specific dark field threshold, the electronic device prompts, through warning, that a light source irradiates the current dark room environment, and temporarily stops the dark field calibration.

Step (b): Obtain reported values of the three ambient light sensors. For example, a reported value of the primary ALS is M1, and reported values of the auxiliary ALSs are respectively SIB and SIC. Dark field calibration coefficients calculated by the processor are K1c=M1/S1B and K2c=M1/S1C.

Step (c): Determine whether all the dark field calibration coefficients fall within a dark field calibration interval; and proceed to step (d) if all the dark field calibration coefficients fall within the dark field calibration interval; or if not all the dark field calibration coefficients fall within the dark field calibration interval, determine that the calibration of the electronic device fails, prompt, through warning, a user that the dark field calibration is abnormal, and record a related log.

Step (d): The processor switches a pure color image displayed on the screen to red, green, and blue, and repeats steps (b) and (c) to obtain reported values of the sensors and calculate dark field calibration coefficients. For example, when the screen displays red, the dark field calibration coefficients are sequentially K1r and K2r; when green is displayed, the dark field calibration coefficients are K1g and K2g; and when blue is displayed, the dark field calibration coefficients are K1b and K2b. The processor determines whether the dark field calibration coefficients fall within the dark field calibration interval based on the dark field calibration coefficients; and performs step (e) if all the dark field calibration coefficients fall within the dark field calibration interval.

Step (e). Calculate average values of the dark field calibration coefficients of the sensors when images of colors are displayed, to obtain dark field calibration coefficients suitable for all the colors: K1=(K1c+K1r+K1g+K1b)/4 and K2=(K2c+K2r+K2g+K2b)/4; and store the two dark field calibration coefficients in a non-volatile memory of the electronic device.

Step (f): When the electronic device is in a bright field calibration environment, place photosensitive areas of the primary ALS and the two auxiliary ALSs in the electronic device directly below a calibration light source; turn off backlight of the electronic device to ensure that the screen does not emit light, and light the calibration light source. For example, a target calibration value in bright field calibration is L.

Step (g): The processor obtains reported values of the primary ALS and the auxiliary ALS. For example, a reported value of the primary ALS is x1, and reported values of the auxiliary ALSs are respectively y1 and y2. In this case, two reported values of equivalent ambient light are z1=x1−K1×y1 and z2=x1−K2×y2. The processor uses z1 and z2 to perform calibration and obtain, through calculation, two bright field calibration coefficients: a1=L/z1 and a2=L/z2.

Step (h): Determine whether all the bright field calibration coefficients fall within a bright field calibration interval; and if all the bright field calibration coefficients fall within the bright field calibration interval, store the bright field calibration coefficients (such as a1 and a2) in the non-volatile memory of the electronic device; or if not all the bright field calibration coefficients fall within the bright field calibration interval, determine that the calibration of the electronic device fails, prompt, through warning, that the bright field calibration is abnormal, and record a related log.

Through step (a) to step (h), the dark field calibration coefficients K1 and K2 and the bright field calibration coefficients a1 and a2 can be obtained. These calibration coefficients may be stored in the memory. When the electronic device needs to detect intensity of ambient light, the electronic device may invoke the dark field calibration coefficients K1 and K2 and the bright field calibration coefficients a1 and a2 from the memory to accurately calculate intensity of ambient light in a current environment.

The foregoing mainly describes the solutions provided in the embodiments of this application from a perspective of an electronic device. To implement the foregoing functions, the electronic device includes corresponding hardware structures and/or software modules for performing the functions. It should be readily realized by a person skilled in the art that the units and the algorithm steps in the examples described with reference to the embodiments disclosed herein can be implemented in this application by hardware or a combination of hardware and computer software. Whether a function is performed by hardware or computer software driving hardware depends on a specific application and a design constraint condition of the technical solutions. A person skilled in the art may use different methods for specific applications to implement the described functions, but this implementation should not be considered as beyond the scope of this application.

In the embodiments of this application, the device may be divided into functional modules based on the foregoing method examples. For example, each functional module corresponding to each function may be obtained through division, or two or more functions may be integrated into one processing module. The integrated module may be implemented in a form of hardware or a software functional module. It should be noted that module division in the embodiments of this application is merely an example and is merely logical function division. There may be another division manner in an actual implementation.

Figure 19:
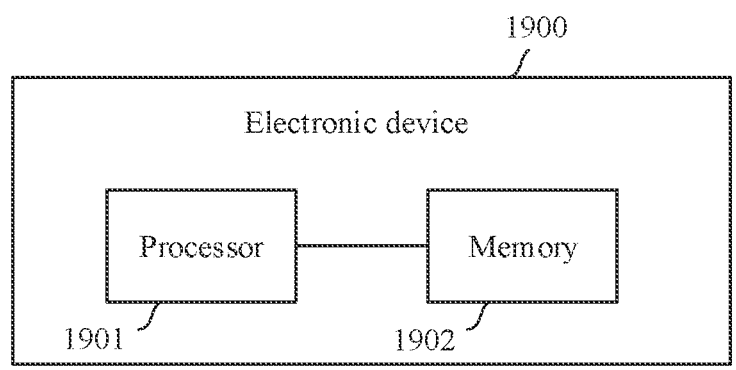
FIG. 19 is a schematic diagram of composition of an electronic device, according to an embodiment of this application.

FIG. 19 is a schematic diagram of composition of another electronic device 1900 according to an embodiment of this application. As shown in FIG. 19, the electronic device 1900 may include a processor 1901 and a memory 1902. The memory 1902 is configured to store computer execution instructions. For example, in some embodiments, when the processor 1901 executes the instructions stored in the memory 1902, the electronic device 1900 is enabled to perform any one of the shown ambient light detection methods of the electronic devices in the foregoing embodiments.

It should be noted that all related content of the steps in the foregoing method embodiments may be referenced to function descriptions of a corresponding functional module, and details are not described herein again.

Figure 20:
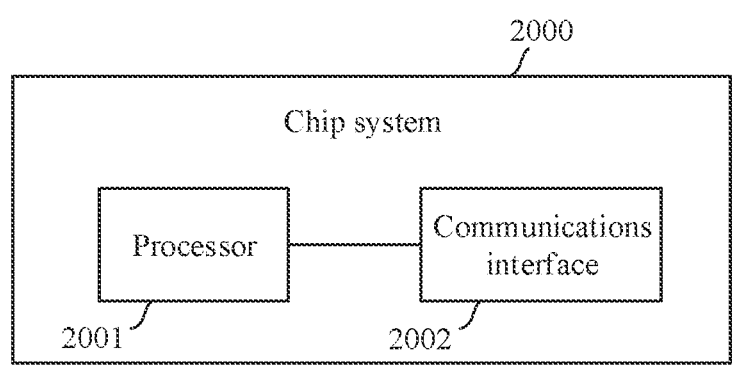
FIG. 20 is a schematic diagram of composition of a chip system, according to an embodiment of this application.

FIG. 20 is a schematic diagram of composition of a chip system 2000. The chip system 2000 may include a processor 2001 and a communications interface 2002, and is configured to support a related device (such as an electronic device) in implementing the functions in the foregoing embodiments. In a possible design, the chip system further includes a memory, configured to store program instructions and data that are necessary for the electronic device. The chip system may include a chip, or may include a chip and another discrete device. It should be noted that, in some implementations of this application, the communications interface 2002 may also be referred to as an interface circuit.

For example, the chip system 2000 may store program instructions and data corresponding to step (1) to step (8), to support the electronic device in implementing dark field calibration provided in the embodiments of this application. In some other examples, the chip system 2000 may store program instructions and data corresponding to step (a) to step (h), to support the electronic device in implementing bright field calibration provided in the embodiments of this application.

It should be noted that all related content of the steps in the foregoing method embodiments may be referenced to function descriptions of a corresponding functional module, and details are not described herein again.

Functions, actions, operations, or steps in the foregoing embodiments may be completely or partially implemented by using software, hardware, firmware, or any combination thereof. When being implemented by using a software program, the functions, actions, operations, or steps may be completely or partially implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from one website, computer, server, or data center to another website, computer, server, or data center in a wired (such as a coaxial cable, an optical fiber, or a digital subscriber line (DSL)) manner or a wireless (such as infrared, wireless, or microwave) manner. The computer-readable storage medium may be any available medium accessible by a computer or data storage devices including one or more servers, data centers, or the like that may be integrated with a medium. The available medium may be a magnetic medium (such as a floppy disk, a hard disk, or a magnetic tape), an optical medium (such as a DVD), or a semiconductor medium (such as a solid state disk (SSD)), or the like.

Although this application is described with reference to specific features and embodiments, it is obvious that various modifications and combinations may be made to this application without departing from the spirit and scope of this application. Accordingly, the specification and the accompanying drawings are merely example descriptions of this application defined by the appended claims and are considered to cover any and all modifications, variations, combinations, or equivalents in the scope of this application. Apparently, a person skilled in the art can make various modifications and variants to this application without departing from the spirit and scope of this application. In this way, this application is also intended to include these modifications and variants made to this application if they fall within the scope of the claims and equivalent technologies thereof.

What is claimed is:

1. An ambient light detection method, comprising:
   determining, by an electronic device, an intensity of ambient light based on a first value, a second value, and a calibration coefficient;
   wherein the electronic device includes a first ambient light detection device and a second ambient light detection device, a first photosensitive area of the first ambient light detection device is used to detect intensity of a first light, a second photosensitive area of the second ambient light detection device is used to detect intensity of a second light, wherein the first light comprises ambient light and leaked screen light, and wherein the second light comprises the leaked screen light;
   wherein the calibration coefficient is configured in the electronic device, wherein the calibration coefficient is used to indicate a relationship between intensity of the ambient light and each of the first value and the second value, the first value is an output value of the first ambient light detection device in response to the first light, and the second value is an output value of the second ambient light detection device in response to the second light;
   wherein the calibration coefficient is obtained based on a dark field calibration coefficient and a bright field calibration coefficient;
   wherein the dark field calibration coefficient is used to indicate a difference between responses made by the first ambient light detection device and the second ambient light detection device to received ambient light and/or leaked screen light;
   wherein the bright field calibration coefficient is used to indicate, in response to there being the ambient light, a correspondence between a first response value and each of the output value of the first ambient light detection device and the output value of the second ambient light detection device, and the first response value is an output value of the first ambient light detection device in response to the ambient light; and
   wherein the calibration coefficient is obtained, by the electronic device, through calculation according to the following formula $$a = L/Z,$$

wherein a is the calibration coefficient, L is intensity of a preset ambient light source in a bright field calibration process, and Z is the bright field calibration coefficient.

2. The method according to claim 1, wherein the dark field calibration coefficient is obtained through dark field calibration, and the dark field calibration comprises:
   controlling, by the electronic device in a dark field environment, a display screen of the electronic device to display a first interface, wherein no ambient light exists in the dark field environment;

obtaining, by the electronic device, a third value output by the first ambient light detection device and a fourth value output by the second ambient light detection device; and obtaining, by the electronic device, the dark field calibration coefficient based on the third value and the fourth value.

3. The method according to claim 2, wherein before the controlling, by the electronic device, the display screen of the electronic device to display the first interface, the method further comprises:

controlling, by the electronic device, the display screen of the electronic device to be off; and determining, by the electronic device, that a current environment is the dark field environment based on the output value of the first ambient light detection device and/or the output value of the second ambient light detection device being less than a dark field threshold.

4. The method according to claim 2, wherein the first interface is a single-color interface.

5. The method according to claim 4, wherein the first interface is a white interface.

6. The method according to claim 2, wherein after the obtaining the third value output by the first ambient light detection device and the fourth value output by the second ambient light detection device, the dark field calibration further comprises:

controlling, by the electronic device, the display screen of the electronic device to display a second interface, wherein a color of the second interface is different from a color of the first interface; and obtaining, by the electronic device, a fifth value output by the first ambient light detection device and a sixth value output by the second ambient light detection device, wherein the obtaining the dark field calibration coefficient based on the third value and the fourth value comprises:

obtaining, by the electronic device, the dark field calibration coefficient through calculation based on the third value, the fourth value, the fifth value, and the sixth value.

7. The method according to claim 1, wherein the bright field calibration coefficient is obtained through bright field calibration, and the bright field calibration comprises:

controlling, by the electronic device in a bright field environment, the display screen of the electronic device to be off, wherein the preset ambient light source is disposed in the bright field environment;

obtaining, by the electronic device, a seventh value output by the first ambient light detection device and an eighth value output by the second ambient light detection device; and determining, by the electronic device, the bright field calibration coefficient based on the seventh value and the eighth value.

8. The method according to claim 7, wherein the determining, by the electronic device, the bright field calibration coefficient based on the seventh value and the eighth value comprises:

determining, by the electronic device, the bright field calibration coefficient according to the following formula:

$$Z = x - K \times y,$$

wherein Z is the bright field calibration coefficient, x is the seventh value, y is the eighth value, and K is the dark field calibration coefficient.

9. The method according to claim 1, wherein after the obtaining, by the electronic device, the calibration coefficient, the method further comprises:

storing, by the electronic device, the calibration coefficient in a memory of the electronic device.

10. The method according to claim 1, wherein:

based on the dark field calibration coefficient not falling within a preset dark field calibration interval, determining that the electronic device currently performing dark field calibration fails in the calibration; or based on the bright field calibration coefficient not falling within a preset bright field calibration interval, determining that the electronic device currently performing bright field calibration fails in the calibration.

11. A non-transitory computer-readable storage medium comprising computer instructions, wherein in response to the computer instructions being run on the electronic device, the electronic device is enabled to perform the ambient light detection method according to claim 1.

12. A chip system, wherein the chip system comprises an interface circuit and a processor, the interface circuit and the processor are interconnected by using a line, the interface circuit is configured to receive a signal from a memory and send the signal to the processor, wherein the signal comprises computer instructions stored in the memory, and in response to the processor executing the computer instructions, the chip system performs the ambient light detection method according to claim 1.

13. An ambient light detection method, applied to an electronic device, wherein a first ambient light detection device and a second ambient light detection device are disposed in the electronic device, a first photosensitive area of the first ambient light detection device is used to detect intensity of first light, a second photosensitive area of the second ambient light detection device is used to detect intensity of second light, the first light comprises ambient light and leaked screen light, and the second light comprises the leaked screen light, wherein the method comprises:

receiving, by the first ambient light detection device, the first light;

outputting, by the first ambient light detection device, a first value, wherein the first value is used to identify the intensity of the first light;

receiving, by the second ambient light detection device, the second light;

outputting, by the second ambient light detection device, a second value, wherein the second value is used to identify the intensity of the second light; and determining, by a processor of the electronic device, intensity of the ambient light based on the first value, the second value, and a calibration coefficient stored in the electronic device;

wherein the calibration coefficient is obtained based on a dark field calibration coefficient and a bright field calibration coefficient;

wherein the dark field calibration coefficient is used to indicate a difference between responses made by the first ambient light detection device and the second ambient light detection device to received ambient light and/or leaked screen light;

wherein the bright field calibration coefficient is used to indicate, in response to there being the ambient light, a correspondence between a first response value and each of the output value of the first ambient light detection device and the output value of the second ambient light detection device, and the first response value is an output value of the first ambient light detection device in response to the ambient light; and wherein the calibration coefficient is obtained, by the electronic device, through calculation according to the following formula a=L/Z, wherein a is the calibration coefficient, L is intensity of a preset ambient light source in a bright field calibration process, and Z is the bright field calibration coefficient.

14. The method according to claim 13, wherein the calibration coefficient is used to indicate a relationship between intensity of the ambient light and each of the first value and the second value.

15. The method according to claim 13, wherein before the determining, by the processor of the electronic device, the intensity of the ambient light based on the first value, the second value, and the calibration coefficient stored in the electronic device, the method further comprises:

obtaining, by the processor, the first value from the first ambient light detection device, and obtaining the second value from the second ambient light detection device.

16. The method according to claim 13, further comprising:

reading, by the processor, the calibration coefficient from a memory of the electronic device, wherein the calibration coefficient is used to indicate a relationship between the intensity of the ambient light and each of the first value and the second value.

17. An electronic device, wherein the electronic device comprises one or more processors and one or more memories, the one or more memories are coupled to the one or more processors, the one or more memories store computer instructions, and in response to the one or more processors executing the computer instructions, the electronic device is enabled to perform an ambient light detection method comprising:

determining an intensity of ambient light based on a first value, a second value, and a calibration coefficient;

wherein the electronic device includes a first ambient light detection device and a second ambient light detection device, a first photosensitive area of the first ambient light detection device is used to detect intensity of a first light, a second photosensitive area of the second ambient light detection device is used to detect intensity of a second light, wherein the first light comprises ambient light and leaked screen light, and the second light comprises the leaked screen light;

wherein the calibration coefficient is configured in the electronic device, wherein the calibration coefficient is used to indicate a relationship between intensity of the ambient light and each of the first value and the second value, the first value is an output value of the first ambient light detection device in response to the first light, and the second value is an output value of the second ambient light detection device in response to the second light;

wherein the calibration coefficient is obtained based on a dark field calibration coefficient and a bright field calibration coefficient;

wherein the dark field calibration coefficient is used to indicate a difference between responses made by the first ambient light detection device and the second ambient light detection device to received ambient light and/or leaked screen light;

wherein the bright field calibration coefficient is used to indicate, in response to there being the ambient light, a correspondence between a first response value and each of the output value of the first ambient light detection device and the output value of the second ambient light detection device, and the first response value is an output value of the first ambient light detection device in response to the ambient light; and wherein the calibration coefficient is obtained, by the electronic device, through calculation according to the following formula a=L/Z, wherein a is the calibration coefficient, L is intensity of a preset ambient light source in a bright field calibration process, and Z is the bright field calibration coefficient.

* * * * *